(12) United States Patent
Chen

(10) Patent No.: US 8,078,027 B2
(45) Date of Patent: Dec. 13, 2011

(54) FOCUS ENHANCING ELECTROMAGNETIC WAVE PROPAGATING DEVICE

(75) Inventor: Kuan-Ren Chen, Tainan (TW)

(73) Assignee: National Cheng Kung University, Tainan (TW)

( * ) Notice: Subject to any disclaimer, the term of this patent is extended or adjusted under 35 U.S.C. 154(b) by 187 days.

(21) Appl. No.: 12/629,725

(22) Filed: Dec. 2, 2009

(65) Prior Publication Data
US 2010/0134890 A1   Jun. 3, 2010

Related U.S. Application Data

(60) Provisional application No. 61/119,493, filed on Dec. 3, 2008.

(51) Int. Cl.
*G02B 6/10* (2006.01)
*G02B 27/00* (2006.01)
*G02F 1/035* (2006.01)
*G02F 1/29* (2006.01)
*G01B 9/02* (2006.01)

(52) U.S. Cl. ............ 385/129; 385/3; 359/319; 359/577; 356/477

(58) Field of Classification Search .............. 385/3, 129; 359/319, 577; 356/477
See application file for complete search history.

(56) References Cited

U.S. PATENT DOCUMENTS 6,317,536 B1 * 11/2001 Bhagavatula et al. .......... 385/24
6,917,736 B1 *  7/2005 Ersoy .............................. 385/37

* cited by examiner

*Primary Examiner* — Ryan Lepisto
*Assistant Examiner* — Jerry Blevins
(74) *Attorney, Agent, or Firm* — Stephen A. Bent; Foley & Lardner LLP

(57) ABSTRACT

A focus enhancing electromagnetic wave propagating device includes a main body formed with a main wave-propagating structure (MS) for focusing an electromagnetic wave into a focusing light spot, and an auxiliary wave-propagating channel (AC) for allowing the wave to propagate toward the focusing light spot. A phase difference is present between the wave after traveling through the MS at its exit end and the wave after traveling through the AC at its exit opening, such that constructive interference is generated at the focusing light spot therebetween. The required phase difference is a function of a distance between the focusing light spot and the exit end of the MS, a distance between the focusing light spot and the exit opening of the AC, velocities of the wave after traveling through each of the MS and the AC, and angular frequencies of the wave after traveling through each of the MS and the AC.

22 Claims, 19 Drawing Sheets

FOCUS ENHANCING ELECTROMAGNETIC WAVE PROPAGATING DEVICE

CROSS-REFERENCE TO RELATED APPLICATION

This application claims priority of U.S. patent provisional application Ser. No. 61/119,493, entitled "Electromagnetic wave propagating device", filed on Dec. 3, 2008.

BACKGROUND OF THE INVENTION

1. Field of the Invention

The invention relates to an electromagnetic wave propagating device, more particularly to a focus enhancing electromagnetic wave propagating device that reduces a size of a focusing light spot and that increases a luminance intensity of the focusing light spot.

2. Description of the Related Art

Electromagnetic wave technology, especially optical technology, is one of the most widely used basic technologies in high-technological industries such as electro-optics, imaging/sensing, bio and medical examination, precision fabrication and measurement, semiconductor industry, etc. Therefore, the search for ways to enhance the intensity, resolution and precision of optical technology is what both the academic and industrial communities are striving for.

Currently, there exist three methods for enhancing optical resolution, which include reducing the wavelength of the light beam, increasing the refraction index of an optical medium through which the light beam propagates, and adapting an optical lens utilizing the half-angle of the maximum cone of light.

The present invention aims at providing an alternative way of enhancing optical focusing, resolution and precision.

SUMMARY OF THE INVENTION

Therefore, the object of the present invention is to provide a focus enhancing electromagnetic wave propagating device that reduces a size of a focusing light spot and that increases luminance intensity of the focusing light spot.

According to one aspect of the present invention, there is provided a focus enhancing electromagnetic wave propagating device that is adapted for use with a wave emanating block, from which an electromagnetic wave having a wavelength is adapted to propagate in a wave-propagating direction. The focus enhancing electromagnetic wave propagating device includes a main body that has surfaces capable of blocking propagation of the electromagnetic wave, and that includes an incident side and an exit side opposite to the incident side in the wave-propagating direction. The main body is formed with a main wave-propagating structure that extends from the incident side to the exit side, that defines a central axis, and that is adapted to allow the electromagnetic wave to propagate from the wave emanating block therethrough for focusing into a focusing light spot. The main body is further formed with an auxiliary wave-propagating channel that extends from the incident side to the exit side, that has an inner dimension not greater than the wavelength of the electromagnetic wave, and that defines a channel axis, which is parallel to the central axis. The main wave-propagating structure has an exit end at the exit side of the main body. The auxiliary wave-propagating channel has an exit opening at the exit side of the main body. The auxiliary wave-propagating channel is adapted to allow the electromagnetic wave to propagate from the wave emanating block therethrough toward the focusing light spot.

A phase difference is present between the electromagnetic wave after traveling through the main wave-propagating structure at the exit end of the main wave-propagating structure and the electromagnetic wave after traveling through the auxiliary wave-propagating channel at the exit opening of the auxiliary wave-propagating channel, such that constructive interference is generated at the focusing light spot between the electromagnetic wave traveling through the main wave-propagating structure and the electromagnetic wave traveling through the auxiliary wave-propagating channel. The required phase difference is a function of a distance between the focusing light spot and the exit end of the main wave-propagating structure, a distance between the focusing light spat and the exit opening of the auxiliary wave-propagating channel, velocities of the electromagnetic wave after traveling through each of the main wave-propagating structure and the auxiliary wave-propagating channel, and angular frequencies of the electromagnetic wave after traveling through each of the main wave-propagating structure and the auxiliary wave-propagating channel.

In particular, the distance between the exit opening of the auxiliary wave-propagating channel and the focusing light spot ranges between the following values:

$$r_A^+ = \frac{v_A}{\omega_A}\left(\Delta\phi + \frac{\pi}{2} + \frac{\omega_M}{v_M}r_M\right)$$

$$r_A^- = \frac{v_A}{\omega_A}\left(\Delta\phi - \frac{\pi}{2} + \frac{\omega_M}{v_M}r_M\right)$$

where $r_A^+$ is one of a maximum value and a minimum value of the distance between the exit opening of the auxiliary wave-propagating channel and the focusing light spot, $r_A^-$ is the other one of a maximum value and a minimum value of the distance between the exit opening of the auxiliary wave-propagating channel and the focusing light spot, $v_A$ is the velocity of the electromagnetic wave after traveling through the auxiliary wave-propagating channel, $\omega_A$ is the angular frequency of the electromagnetic wave after traveling through the auxiliary wave-propagating channel, $\Delta\phi$ is the phase difference between the electromagnetic wave after traveling through the main wave-propagating structure at the exit end of the main wave-propagating structure and the electromagnetic wave after traveling through the auxiliary wave-propagating channel at the exit opening of the auxiliary wave-propagating channel, $\omega_M$ is the angular frequency of the electromagnetic wave after traveling through the main wave-propagating structure, $v_M$ is the velocity of the electromagnetic wave after traveling through the main wave-propagating structure, and $r_M$ is the distance between the exit end of the main wave-propagating structure and the focusing light spot.

According to another aspect of the present invention, there is provided a method for focusing an electromagnetic wave that propagates from a wave emanating block in a wave-propagating direction into a focusing light spot. The method includes the step of: providing a focus enhancing electromagnetic wave propagating device including a main body that has surfaces capable of blocking propagation of the electromagnetic wave, and that includes an incident side and an exit side opposite to the incident side in the wave-propagating direction. The main body is formed with a main wave-propagating structure that extends from the incident side to the exit side, that defines a central axis, and that is adapted to allow the electromagnetic wave to propagate from the wave emanating block therethrough for focusing into a focusing light spot. The main body is further formed with an auxiliary wave-propagating channel that extends from the incident side to the exit side, that has an inner dimension not greater than the wavelength of the electromagnetic wave, and that defines a channel axis, which is parallel to the central axis. The main wave-propagating structure has an exit end at the exit side of the main body. The auxiliary wave-propagating channel has an exit opening at the exit side of the main body, and is adapted to allow the electromagnetic wave to propagate from the wave emanating block therethrough toward the focusing light spot.

A phase difference is present between the electromagnetic wave after traveling through the main wave-propagating structure at the exit end of the main wave-propagating structure and the electromagnetic wave after traveling through the auxiliary wave-propagating channel at the exit opening of the auxiliary wave-propagating channel, such that constructive interference is generated at the focusing light spot between the electromagnetic wave traveling through the main wave-propagating structure and the electromagnetic wave traveling through the auxiliary wave-propagating channel. The required phase difference is a function of a distance between the focusing light spot and the exit end of the main wave-propagating structure, a distance between the focusing light spot and the exit opening of the auxiliary wave-propagating channel, velocities of the electromagnetic wave after traveling through each of the main wave-propagating structure and the auxiliary wave-propagating channel, and angular frequencies of the electromagnetic wave after traveling through each of the main wave-propagating structure and the auxiliary wave-propagating channel.

According to still another aspect of the present invention, there is provided a light spot generator that includes a wave emanating block, from which an electromagnetic wave having a wavelength is adapted to propagate in a wave-propagating direction, and a focus enhancing electromagnetic wave propagating device. The focus enhancing electromagnetic wave propagating device includes a main body that has surfaces capable of blocking propagation of the electromagnetic wave, and that includes an incident side and an exit side opposite to the incident side in the wave-propagating direction. The main body is formed with a main wave-propagating structure that extends from the incident side to the exit side, that defines a central axis, and that is adapted to allow the electromagnetic wave to propagate from the wave emanating block therethrough for focusing into a focusing light spot. The main body is further formed with an auxiliary wave-propagating channel that extends from the incident side to the exit side, that has an inner dimension not greater than the wavelength of the electromagnetic wave, and that defines a channel axis, which is parallel to the central axis. The main wave-propagating structure has an exit end at the exit side of the main body. The auxiliary wave-propagating channel has an exit opening at the exit side of the main body, and is adapted to allow the electromagnetic wave to propagate from the wave emanating block therethrough toward the focusing light spot.

A phase difference is present between the electromagnetic wave after traveling through the main wave-propagating structure at the exit end of the main wave-propagating structure and the electromagnetic wave after traveling through the auxiliary wave-propagating channel at the exit opening of the auxiliary wave-propagating channel, such that constructive interference is generated at the focusing light spot between the electromagnetic wave traveling through the main wave-propagating structure and the electromagnetic wave traveling through the auxiliary wave-propagating channel. The required phase difference is a function of a distance between the focusing light spot and the exit end of the main wave-propagating structure, a distance between the focusing light spot and the exit opening of the auxiliary wave-propagating channel, velocities of the electromagnetic wave after traveling through each of the main wave-propagating structure and the auxiliary wave-propagating channel, and angular frequencies of the electromagnetic wave that travels through each of the main wave-propagating structure and the auxiliary wave-propagating channel.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1A:
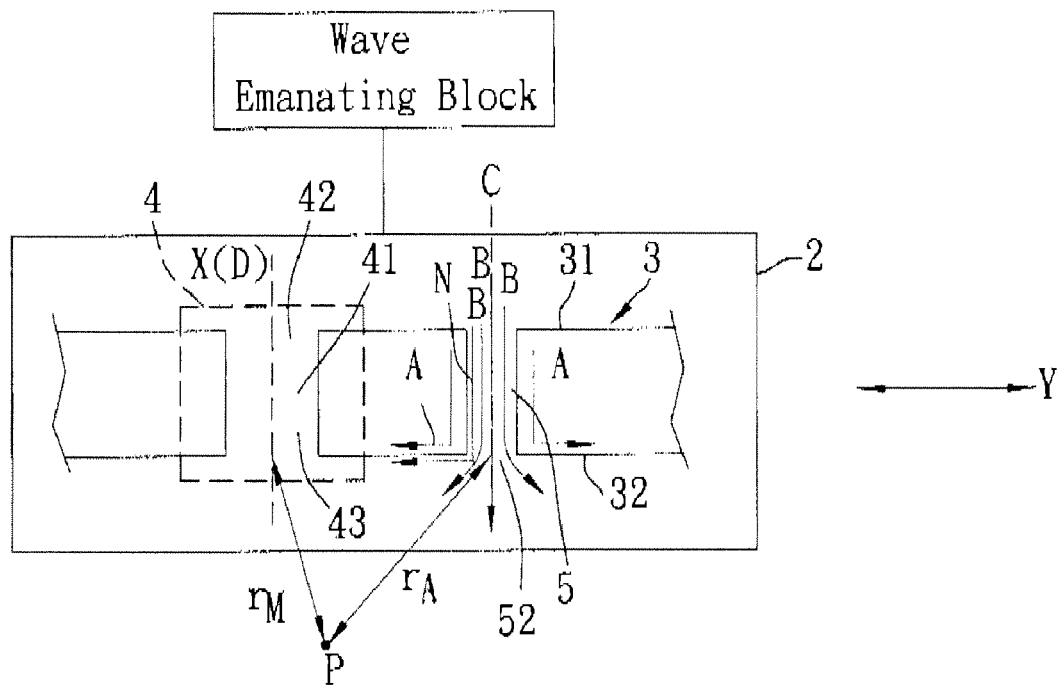
FIG. 1a is a schematic diagram of a light spot generator according to the first implementation of the first preferred embodiment of the present invention, in which a focus enhancing electromagnetic wave propagating device is shown in an X-Y plane.

Before the present invention is described in greater detail, it should be noted that like elements are denoted by the same reference numerals throughout the disclosure.

With reference to FIG. 1a, a light spot generator according to the first implementation of the first preferred embodiment of the present invention includes a wave emanating block 1, from which an electromagnetic wave having a wavelength ($\lambda$) propagates in a wave-propagating direction, and a focus enhancing electromagnetic wave propagating device 2. The electromagnetic wave propagating device 2 includes a main body 3 that has surfaces capable of blocking propagation of the electromagnetic wave, and that includes an incident side 31 and an exit side 32 opposite to the incident side 31 in the wave-propagating direction. The main body 3 is formed with a main wave-propagating structure 4 that extends from the incident side 31 to the exit side 32, that defines a central axis (X), and that is adapted to allow the electromagnetic wave to propagate from the wave emanating block 1 therethrough for focusing into a focusing light spot (P).

The main body 3 is further formed with an auxiliary wave-propagating channel 5 that extends from the incident side 31 to the exit side 32, that has an inner dimension not greater than the wavelength (λ) of the electromagnetic wave, and that defines a channel axis (C), which is parallel to the central axis (X). The main wave-propagating structure 4 has an incident end 42 at the incident side 31 of the main body 3, and an exit end 43 at the exit side 32 of the main body 3. The auxiliary wave-propagating channel 5 has an incident opening 51 at the incident side 31 of the main body 3, an exit opening 52 at the exit side 32 of the main body 3, and an inner portion extending between the incident opening 51 and the exit opening 52, and defining the channel axis (C). The auxiliary wave-propagating channel 5 is adapted to allow the electromagnetic wave to propagate from the wave emanating block 1 therethrough toward the focusing light spot (P).

A phase difference (Δφ) is required to be present between the electromagnetic wave after traveling through the main wave-propagating structure 4 at the exit end 43 of the main wave-propagating structure 4 and the electromagnetic wave after traveling through the auxiliary wave-propagating channel 5 at the exit opening 52 of the auxiliary wave-propagating channel 5, such that constructive interference is generated at the focusing light spot (P) between the electromagnetic wave traveling through the main wave-propagating structure 4 and the electromagnetic wave traveling through the auxiliary wave-propagating channel 5. As a result, luminance intensity at an area proximate to and including the focusing light spot (P) is enhanced. In addition, a full-width-half-maximum (FWHM) spot size of the focusing light spot (P) is reduced. The required phase difference (Δφ) is a function of a distance between the focusing light spot (P) and the exit end 43 of the main wave-propagating structure 4, a distance between the focusing light spot (P) and the exit opening 52 of the auxiliary wave-propagating channel 5, velocities of the electromagnetic wave after traveling through each of the main wave-propagating structure 4 and the auxiliary wave-propagating channel 5, and angular frequencies of the electromagnetic wave after traveling through each of the main wave-propagating structure 4 and the auxiliary wave-propagating channel 5.

In particular, the distance between the exit opening 52 of the auxiliary wave-propagating channel 5 and the focusing light spot (P) ranges between the values represented by the following Equation 1 and Equation 2:

$$r_A^+ = \frac{v_A}{\omega_A}\left(\Delta\phi + \frac{\pi}{2} + \frac{\omega_M}{v_M}r_M\right) \quad \text{(Equation 1)}$$

$$r_A^- = \frac{v_A}{\omega_A}\left(\Delta\phi - \frac{\pi}{2} + \frac{\omega_M}{v_M}r_M\right) \quad \text{(Equation 2)}$$

where $r_A^+$ is one of a maximum value and a minimum value of the distance between the exit opening 52 of the auxiliary wave-propagating channel 5 and the focusing light spot (P), $r_A^-$ is the other one of a maximum value and a minimum value of the distance between the exit opening 52 of the auxiliary wave-propagating channel 5 and the focusing light spot (P), $v_A$ is the velocity of the electromagnetic wave after traveling through the auxiliary wave-propagating channel 5, $\omega_A$ is the angular frequency of the electromagnetic wave after traveling through the auxiliary wave-propagating channel 5, Δφ is the phase difference between the electromagnetic wave after traveling through the main wave-propagating structure 4 at the exit end 43 of the main wave-propagating structure 4 and the electromagnetic wave after traveling through the auxiliary wave-propagating channel 5 at the exit opening 52 of the auxiliary wave-propagating channel 5, $\omega_M$ is the angular frequency of the electromagnetic wave after traveling through the main wave-propagating structure 4, $v_M$ is the velocity of the electromagnetic wave after traveling through the main wave-propagating structure 4, and $r_M$ is the distance between the exit end 43 of the main wave-propagating structure 4 and the focusing light spot (P).

In this embodiment, the main wave-propagating structure 4 is formed with a main wave-propagating channel 41, which extends from the incident side 31 to the exit side 32 of the main body 3, which has an exit opening 43 (given the same reference numeral as the exit end) at the exit end 43 of the main wave-propagating structure 4, and which defines a central line (D) that coincides with the central axis (X). The channel axis (C) of the auxiliary wave-propagating channel 5 is spaced apart from the central line (D) of the main wave-propagating channel 41, or the central axis (X) of the main wave-propagating structure 4, along a first axis (Y).

It should be noted herein that due to the presence of the auxiliary wave-propagating channel 5 at one side of the main wave-propagating structure 4, the position of the focusing light spot (P) is slightly adjusted. For example, in this embodiment, the focusing light spot (P) would originally be disposed along the central axis (X) of the main wave-propagating structure 4 when the main body 3 is not formed with the auxiliary wave-propagating channel 5. However, with the formation of the auxiliary wave-propagating channel 5, the focusing light spot (P) is shifted toward the auxiliary wave-propagating channel 5 along the first axis (Y).

By forming the auxiliary wave-propagating channel 5 in the main body 3 with the inner dimension not greater than the wavelength (λ) of the electromagnetic wave, surface plasma waves (denoted by (A)) and near-fields (denoted by (N)) near a surface of the main body 3 are excited by the electromagnetic wave (denoted by (B)) passing through the auxiliary wave-propagating channel 5 to move along the surface of the main body 3 within the auxiliary wave-propagating channel 5, and create a guiding effect to guide the electromagnetic wave (B) to travel toward the direction of the flow of the surface plasma waves (A) after propagating through the auxiliary wave-propagating channel 5. As a result, a portion of the electromagnetic wave (B) traveling out of the auxiliary wave-propagating channel 5 is traveling more toward the central axis (X) of the main wave-propagating structure 4, and contributes to enhance the luminance intensity at the area proximate to and including the focusing light spot (P).

It should be noted herein that the phase difference Δφ between the electromagnetic wave after traveling through the main wave-propagating channel 41 at the exit opening 43 of the main wave-propagating channel 41 and the electromagnetic wave after traveling through the auxiliary wave-propagating channel 5 at the exit opening 52 of the auxiliary wave-propagating channel 5 is also affected by other factors, such as a distance between the channel axis (C) of the auxiliary wave-propagating channel 5 and the central axis (X) of the main wave-propagating structure 4, a shape of the auxiliary wave-propagating channel 5 (as will be discussed later), a configuration of the main wave-propagating structure 4, and a material inside the auxiliary wave-propagating channel 5. These factors and the aforementioned Equations 1 and 2 cooperate to create complex physics mechanism for the enhancement of the luminance intensity and the reduction of size of the focusing light spot (P).

Figure 1B:
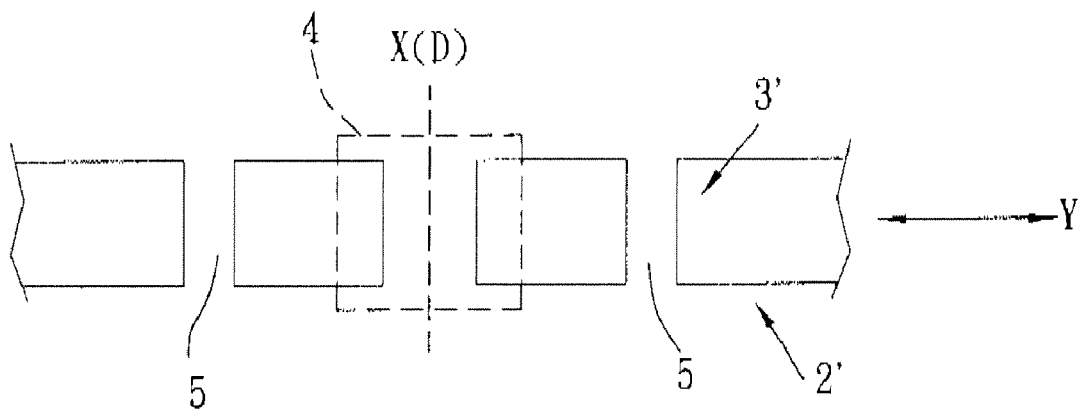
FIG. 1b is a schematic side view of a light spot generator according to the second implementation of the first preferred embodiment of the present invention, in which a focus enhancing electromagnetic wave propagating device is shown in an X-Y plane.

With reference to FIG. 1b, according to the second implementation of the first preferred embodiment, the focus enhancing electromagnetic wave propagating device 2' differs from the first implementation of the first preferred embodiment in that the main body 3' is formed with two of the auxiliary wave-propagating channels 5, and that the main wave-propagating structure 4 is flanked by the auxiliary wave-propagating channels 5 along the first axis (Y). The auxiliary wave-propagating channels 5 are disposed symmetrically relative to the central axis (X) of the main wave-propagating structure 4.

Figure 2A:
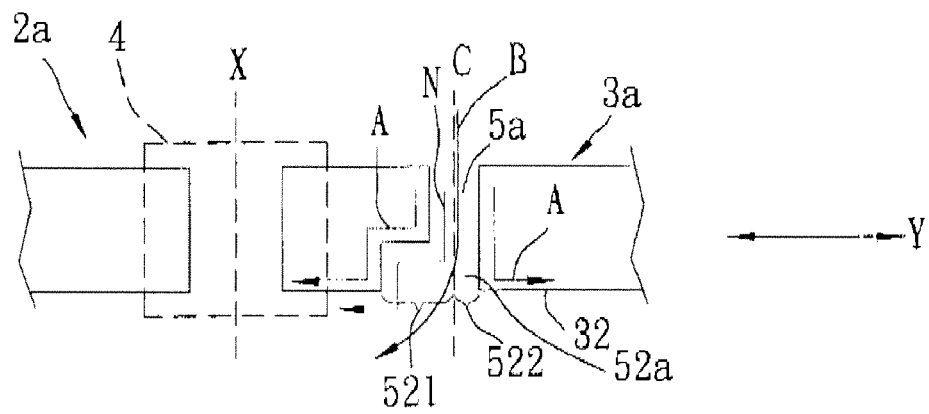
FIG. 2a is a schematic side view of a focus enhancing electromagnetic wave propagating device according to the first implementation of the second preferred embodiment of the present invention in the X-Y plane.

With reference to FIG. 2a, according to the second preferred embodiment of the present invention, the focus enhancing electromagnetic wave propagating device 2a differs from the focus enhancing electromagnetic wave propagating device 2 of the first preferred embodiment in that the exit opening 52a of the auxiliary wave-propagating channel 5a is asymmetrical about the channel axis (C) in a plane defined by the central axis (X) and the first axis (Y). The plane defined by the central axis (X) and the first axis (Y) is hereinafter referred to as the X-Y plane. In particular, the exit opening 52a has first and second halves 521, 522 about the channel axis (C) in the plane defined by the central axis (X) and the first axis (Y). The first and second halves 521, 522 are respectively proximate to and distal from the central axis (X) of the main wave-propagating structure 4. The first half 521 has a dimension greater than that of the second half 522, such that the main body 3a recedes from the auxiliary wave-propagating channel 5a at the exit opening 52a toward the central axis (X) of the main wave-propagating structure 4.

By forming the receding structure in the main body 3a so as to form the first half 521 and result in the asymmetrical exit opening 52a of the auxiliary wave-propagating channel 5a, a surface plasma wave (denoted by (A)) excited by the electromagnetic wave (denoted by (B)) passing through the auxiliary wave-propagating channel 5a moves along the receding structure (A)). In addition, a near-field wave (denoted by (N)) is generated corresponding to the surface plasma wave (A) to move along the surface of the main body 3a at the receding structure. The surface plasma wave (A) and the near-field wave (N) cooperate to create a greater guiding effect, such that the electromagnetic wave traveling through the auxiliary wave-propagating channel 5a is guided more toward the central axis (X) of the main wave-propagating structure 4 while the intensity of such electromagnetic wave is still high. In other words, due to the asymmetrical feature at the exit opening 52a of the auxiliary wave-propagating channel 5a, propagation path of the electromagnetic wave (B) traveling through the auxiliary wave-propagating channel 5a bends toward the central axis (X) of the main wave-propagating structure 4, and contributes to enhance the luminance intensity at the area proximate to and including the focusing light spot (P) with an effect even greater than that of the first implementation shown in FIG. 1a.

Figure 2B:
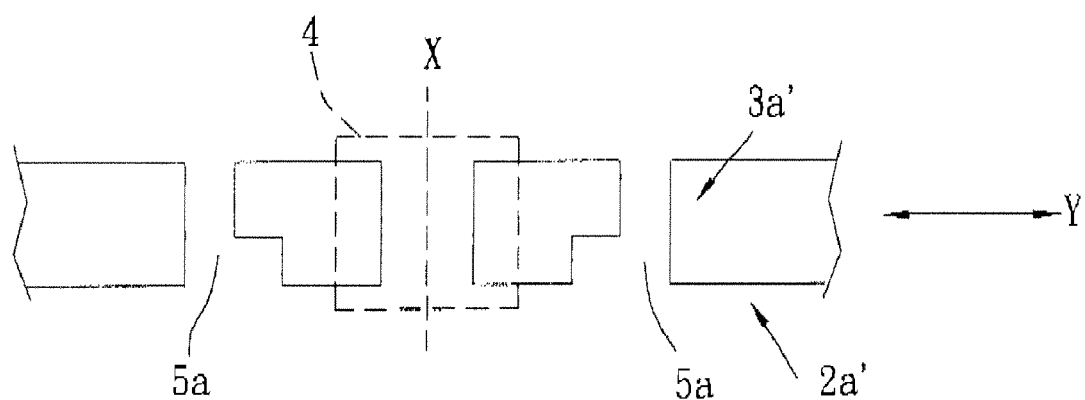
FIG. 2b is a schematic side view of a focus enhancing electromagnetic wave propagating device according to the second implementation of the second preferred embodiment of the present invention in the X-Y plane.

With reference to FIG. 2b, according to the second implementation of the second preferred embodiment, the focus enhancing electromagnetic wave propagating device 2a' differs from the first implementation of the second preferred embodiment in that the main body 3a' is formed with two of the auxiliary wave-propagating channels 5a, and that the main wave-propagating structure 4 is flanked by the auxiliary wave-propagating channels 5a along the first axis (Y). The auxiliary wave-propagating channels 5a are disposed symmetrically relative to the central axis (X) of the main wave-propagating structure 4.

Figure 3:
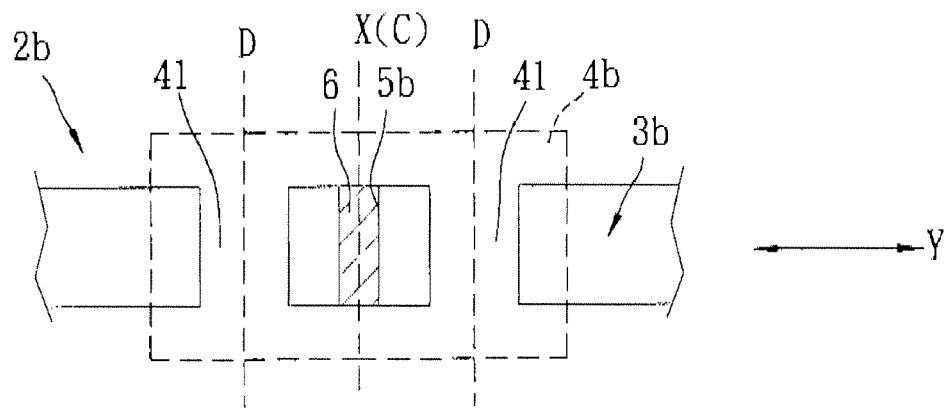
FIG. 3 is a schematic side view of a focus enhancing electromagnetic wave propagating device according to the third preferred embodiment of the present invention in the X-Y plane.

With reference to FIG. 3, according to the third preferred embodiment of the present invention, the focus enhancing electromagnetic wave propagating device 2b differs from the focus enhancing electromagnetic wave propagating device 2 of the first preferred embodiment in that the main wave-propagating structure 4b of the second preferred embodiment is formed with two of the main wave-propagating channels 41, each of which defines a central line (D) that is parallel to and spaced apart from the central axis (X) of the main wave-propagating structure 4b, that the auxiliary wave-propagating channel 5b of the second preferred embodiment is flanked by the main wave-propagating channels 41, and that the focus enhancing electromagnetic wave propagating device 2b further includes a light-transmissible dielectric 6 that is filled in the auxiliary wave-propagating channel 5b. The channel axis (C) of the auxiliary wave-propagating channel 5b is spaced apart from the central line (D) of each of the main wave-propagating channels 41 along the first axis (Y), and coincides with the central axis (X) of the main wave-propagating structure 4b. It should be noted herein that the light-transmissible dielectric 6 may also be filled in each of the main wave-propagating channels 41 of the main wave-propagating structure 4 according to other embodiments of the present invention. Alternatively, the focus enhancing electromagnetic wave propagating device 2b may include two different types of light-transmissible dielectrics that are respectively filled in each of the main wave-propagating channels 41 and the auxiliary wave-propagating channel 5b. For instance, each of the main wave-propagating channels 41 may be filled with a first light-transmissible dielectric (e.g., air), while the auxiliary wave-propagating channel 5b may be filled with a second light-transmissible dielectric (e.g., glass). It is noted that, when the light-transmissible dielectric materials within the auxiliary wave-propagating channel 5b and the main wave-propagating channels 41 are different, the propagating behavior of the electromagnetic wave within the auxiliary wave-propagating channel 5b will be different from that within the main wave-propagating channels 41 (e.g., phase retardation).

Figure 4:
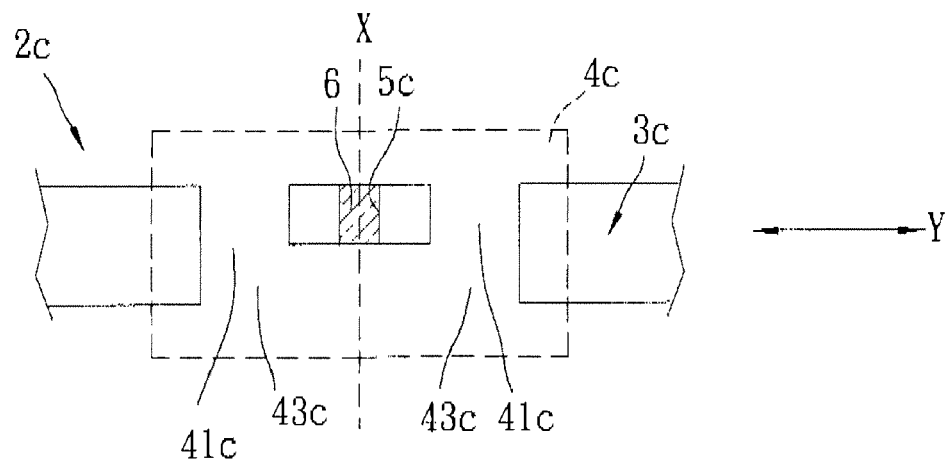
FIG. 4 is a schematic side view of a focus enhancing electromagnetic wave propagating device according to the fourth preferred embodiment of the present invention in the X-Y plane.

With reference to FIG. 4, according to the fourth preferred embodiment of the present invention, the focus enhancing electromagnetic wave propagating device 2c differs from the focus enhancing electromagnetic wave propagating device 2b of the third preferred embodiment in that the exit openings 43c of the main wave-propagating channels 41c are in direct spatial communication with each other along the first axis (Y).

Figure 5:
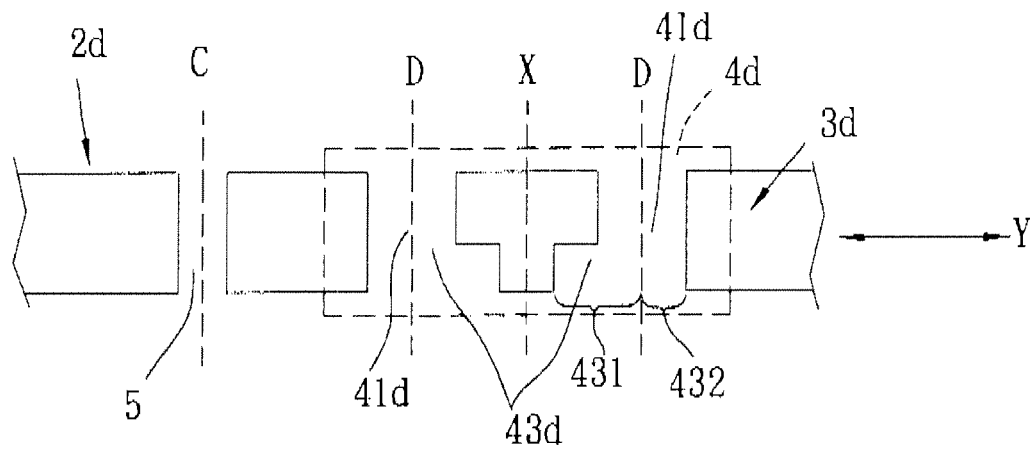
FIG. 5 is a schematic side view of a focus enhancing electromagnetic wave propagating device according to the fifth preferred embodiment of the present invention in the X-Y plane.

With reference to FIG. 5, according to the fifth preferred embodiment of the present invention, the focus enhancing electromagnetic wave propagating device 2d differs from the focus enhancing electromagnetic wave propagating device 2 of the first preferred embodiment in that the main wave-propagating structure 4d is formed with two of the main wave-propagating channels 41d, each of which defines a central line (D) parallel to the central axis (X). The exit openings 43d of each of the main wave-propagating channels 41d is asymmetrical relative to the central line (D) thereof in the plane defined by the central axis (X) and the first axis (Y). The auxiliary wave-propagating channel 5 is disposed proximate to one of the main wave-propagating channels 41d. In particular, the exit opening 43d of each of the main wave-propagating channels 41d has first and second halves 431, 432 about the central line (D) in the plane defined by the central axis (X) and the first axis (Y). The first and second halves 431, 432 are respectively proximate to and distal from the central axis (X) of the main wave-propagating structure 4. The first half 431 has a dimension greater than that of the second half 432, such that the main body 3a recedes from each of the main wave-propagating channels 41d at the exit opening 43d toward the central axis (X) of the main wave-propagating structure 4d.

Figure 6:
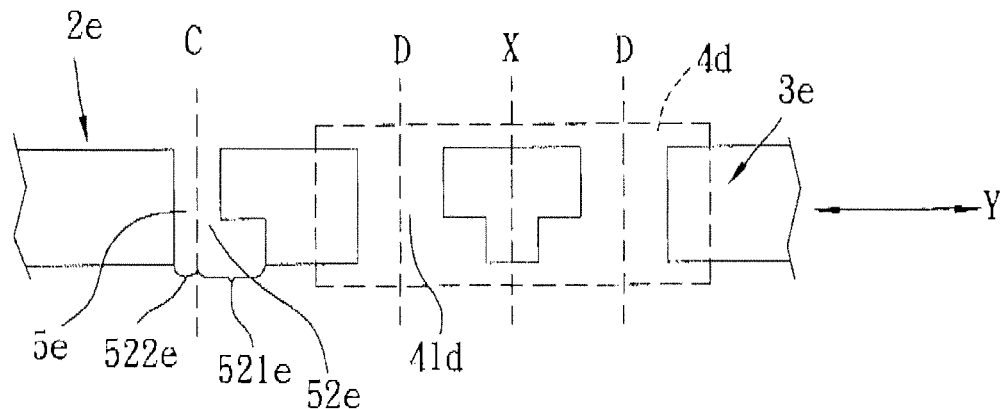
FIG. 6 is a schematic side view of a focus enhancing electromagnetic wave propagating device according to the sixth preferred embodiment of the present invention in the X-Y plane.

With reference to FIG. 6, according to the sixth preferred embodiment of the present invention, the focus enhancing electromagnetic wave propagating device 2e differs from the focus enhancing electromagnetic wave propagating device 2d of the fifth preferred embodiment in that the exit opening 52e of the auxiliary wave-propagating channel 5e of the sixth preferred embodiment is asymmetrical about the channel axis (C) in the plane defined by the central axis (X) and the first axis (Y). In particular, the exit opening 52e has first and second halves 521e, 522e about the channel axis (C) in the plane defined by the central axis (X) and the first axis (Y). The first and second halves 521e, 522e are respectively proximate to and distal from the central line (D) of the proximate one of the main wave-propagating channels 41. The first half 521e has a dimension greater than that of the second half 522e.

Figure 7:
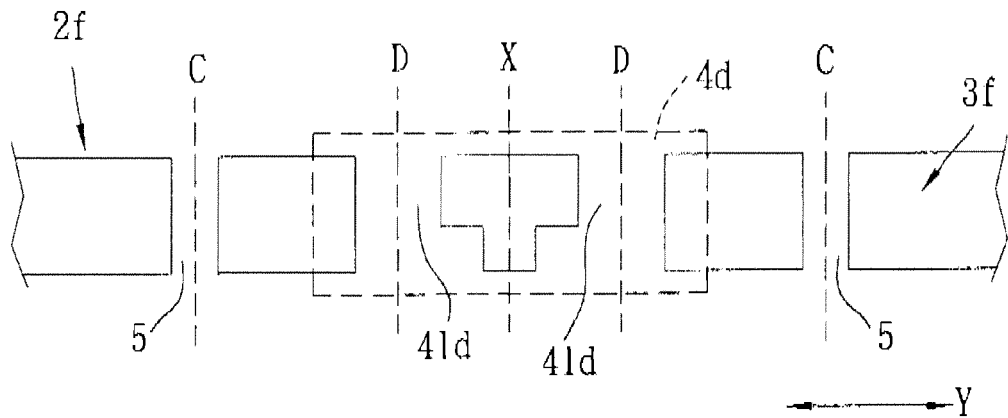
FIG. 7 is a schematic side view of a focus enhancing electromagnetic wave propagating device according to the seventh preferred embodiment of the present invention in the X-Y plane.

With reference to FIG. 7, according to the seventh preferred embodiment of the present invention, the focus enhancing electromagnetic wave propagating device 2f differs from the focus enhancing electromagnetic wave propagating device 2d of the fifth preferred embodiment in that the main body 3f of the seventh preferred embodiment is formed with two of the auxiliary wave-propagating channels 5 that flank the main wave-propagating structure 4d. The channel axis (C) of each of the auxiliary wave-propagating channels 5 is disposed proximate to the central line (D) of a respective one of the main wave-propagating channels 41d, and is spaced apart from the central line (D) of the respective one of the main wave-propagating channels 41d by the spacing distance along the first axis (Y).

Figure 8:
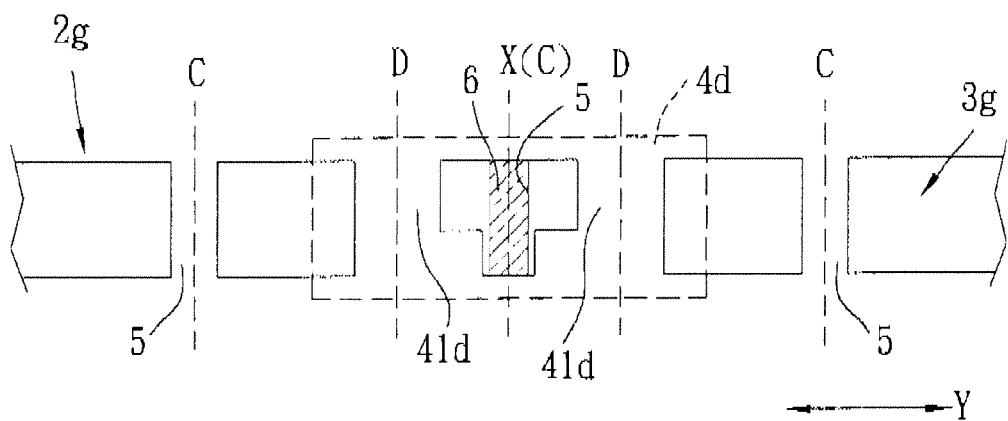
FIG. 8 is a schematic side view of a focus enhancing electromagnetic wave propagating device according to the eighth preferred embodiment of the present invention in the X-Y plane.

With reference to FIG. 8, according to the eighth preferred embodiment of the present invention, the focus enhancing electromagnetic wave propagating device 2g differs from the focus enhancing electromagnetic wave propagating device 2f of the seventh preferred embodiment in that the main body 3g of the eighth preferred embodiment is further formed with an additional auxiliary wave-propagating channel 5 that is interposed between the main wave-propagating channels 41d (in other words, the main body 3g of the eighth preferred embodiment is formed with a total of three auxiliary wave-propagating channels 5), and that the focus enhancing electromagnetic wave propagating 2g a device further includes light-transmissible dielectric 6 that is filled in said additional one of the auxiliary wave-propagating channels 5. The channel axis (C) of said additional one of the auxiliary wave-propagating channels 5 coincides with the central axis (X) of the main wave-propagating structure 4d.

Figure 9:
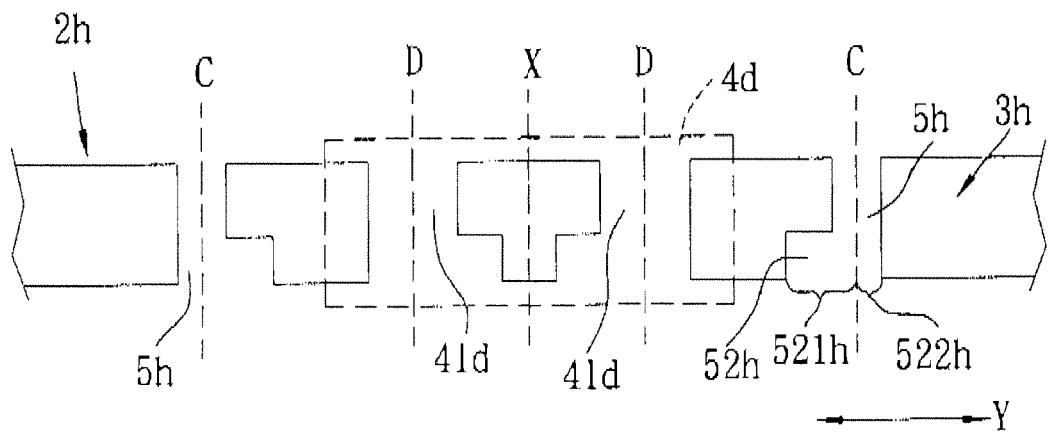
FIG. 9 is a schematic side view of a focus enhancing electromagnetic wave propagating device according to the ninth preferred embodiment of the present invention in the X-Y plane.

With reference to FIG. 9, according to the ninth preferred embodiment of the present invention, the focus enhancing electromagnetic wave propagating device 2h differs from the focus enhancing electromagnetic wave propagating device 2f of the seventh preferred embodiment in that the exit opening 52h of each of the auxiliary wave-propagating channels 5h is asymmetrical about the channel axis (C) in the plane defined by the central axis (X) and the first axis (Y). In particular, the exit opening 52h of each of the auxiliary wave-propagating channels 5h has first and second halves 521h, 522h about the channel axis (C) in the plane defined by the central axis (X) and the first axis (Y). The first and second halves 521h, 522h are respectively proximate to and distal from the central line (D) of the respective one of the main wave-propagating channels 41d. The first half 521h has a dimension greater than that of the second half 522h.

Figure 10:
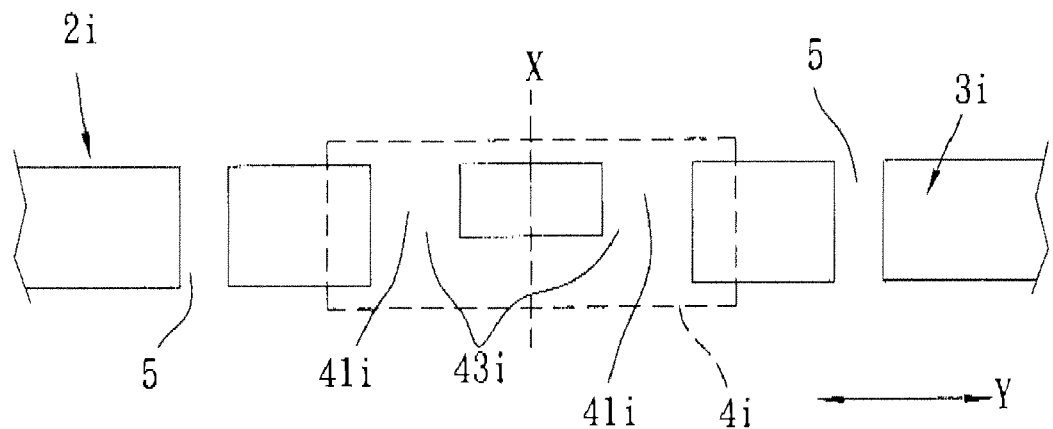
FIG. 10 is a schematic side view of a focus enhancing electromagnetic wave propagating device according to the tenth preferred embodiment of the present invention in the X-Y plane.

With reference to FIG. 10, according to the tenth preferred embodiment of the present invention, the focus enhancing electromagnetic wave propagating device 2i differs from the focus enhancing electromagnetic wave propagating device 2f of the seventh preferred embodiment in that the exit openings 43i of the main wave-propagating channels 41i of the main wave-propagating structure 4i are in direct spatial communication with each other along the first axis (Y).

Figure 11:
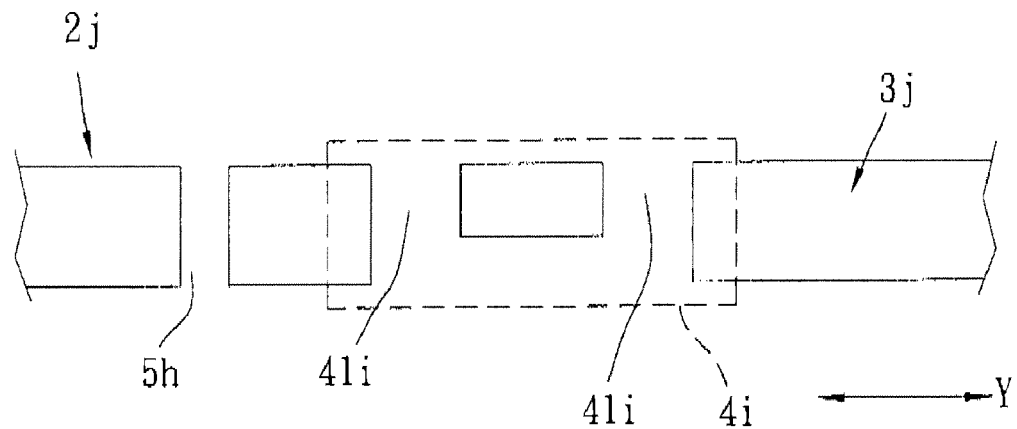
FIG. 11 is a schematic side view of a focus enhancing electromagnetic wave propagating device according to the eleventh preferred embodiment of the present invention in the X-Y plane.

With reference to FIG. 11, according to the eleventh preferred embodiment of the present invention, the focus enhancing electromagnetic wave propagating device 2j differs from the focus enhancing electromagnetic wave propagating device 2i of the tenth preferred embodiment in that there is only one auxiliary wave-propagating channel 5 in the eleventh preferred embodiment, and the auxiliary wave-propagating channel 5 is disposed proximate to one of the main wave-propagating channels 41i.

Figure 12:
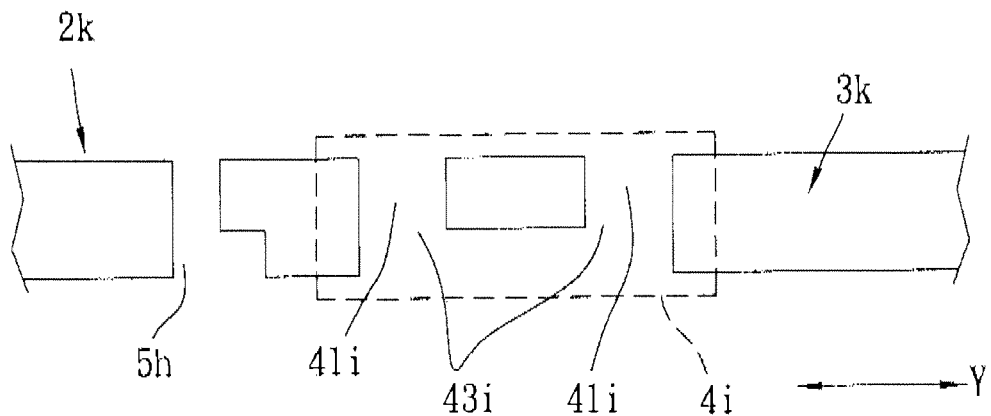
FIG. 12 is a schematic side view of a focus enhancing electromagnetic wave propagating device according to the twelfth preferred embodiment of the present invention in the X-Y plane.

With reference to FIG. 12, according to the twelfth preferred embodiment of the present invention, the focus enhancing electromagnetic wave propagating device 2k differs from the focus enhancing electromagnetic wave propagating device 2e of the sixth preferred embodiment (as shown in FIG. 6) in that the exit openings 43i of the main wave-propagating channels 41i of the main wave-propagating structure 4i of the twelfth preferred embodiment are in direct spatial communication with each other along the first axis (Y).

Figure 13:
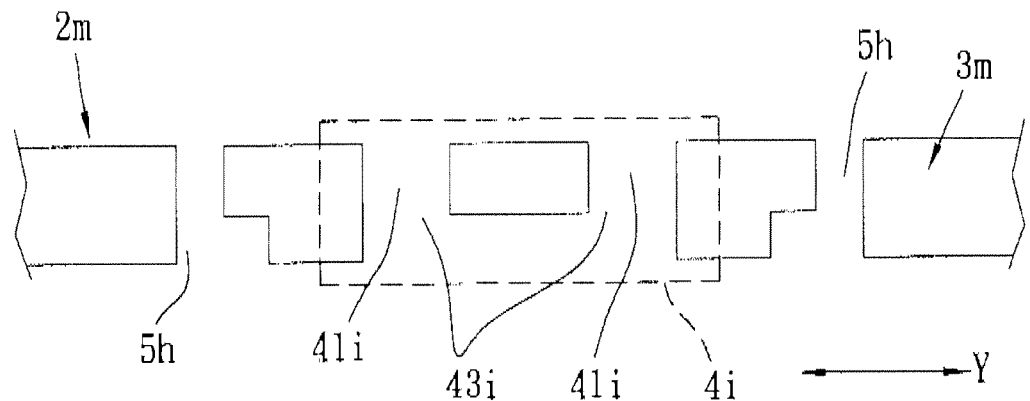
FIG. 13 is a schematic side view of a focus enhancing electromagnetic wave propagating device according to the thirteenth preferred embodiment of the present invention in the X-Y plane.

With reference to FIG. 13, according to the thirteenth preferred embodiment of the present invention, the focus enhancing electromagnetic wave propagating device 2m differs from the focus enhancing electromagnetic wave propagating device 2h of the ninth preferred embodiment (as shown in FIG. 9) in that the exit openings 43i of the main wave-propagating channels 41i of the main wave-propagating structure 4i of the thirteenth preferred embodiment are in direct spatial communication with each other along the first axis (Y).

Figure 14:
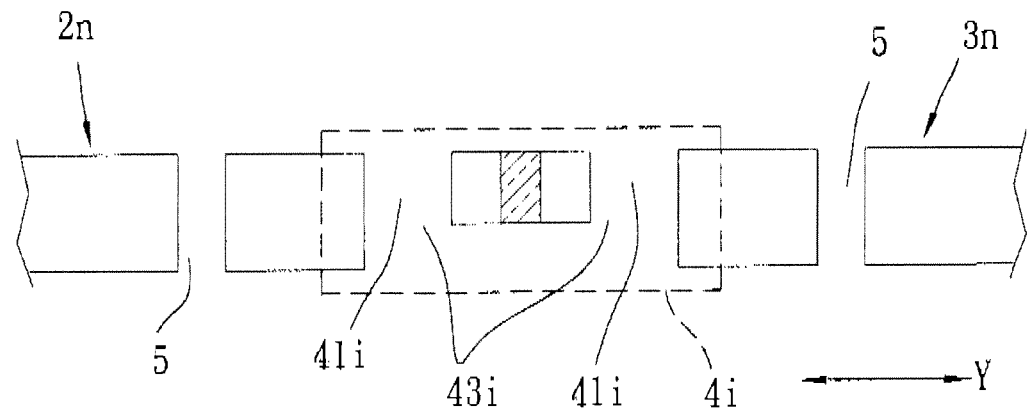
FIG. 14 is a schematic side view of a focus enhancing electromagnetic wave propagating device according to the fourteenth preferred embodiment of the present invention in the X-Y plane.

With reference to FIG. 14, according to the fourteenth preferred embodiment of the present invention, the focus enhancing electromagnetic wave propagating device 2n differs from the focus enhancing electromagnetic wave propagating device 2i of the tenth preferred embodiment (as shown in FIG. 10) in that the exit openings 43i of the main wave-propagating channels 41i of the main wave-propagating structure 4i of the fourteenth preferred embodiment are in direct spatial communication with each other along the first axis (Y).

It should be further noted herein that although FIGS. 1a~1b, 2a~2b, and 3~14 are schematic side views of the focus enhancing electromagnetic wave propagating devices according to various embodiments of the present invention, the configurations and shapes shown therein are also representative of the cross-sectional profiles of the focus enhancing electromagnetic wave propagating devices in the Z-Y plane according to various embodiments of the present invention.

In the following description, the shapes, arrangements and configurations of the main wave-propagating channel (s) and the auxiliary wave-propagating channel (s) in another dimension (a Y-Z plane) will be discussed with reference to FIGS. 15~16, 17a~17d, 18, 19a~19b, 20~22, 23a~23b, and 24~32.

Figure 15:
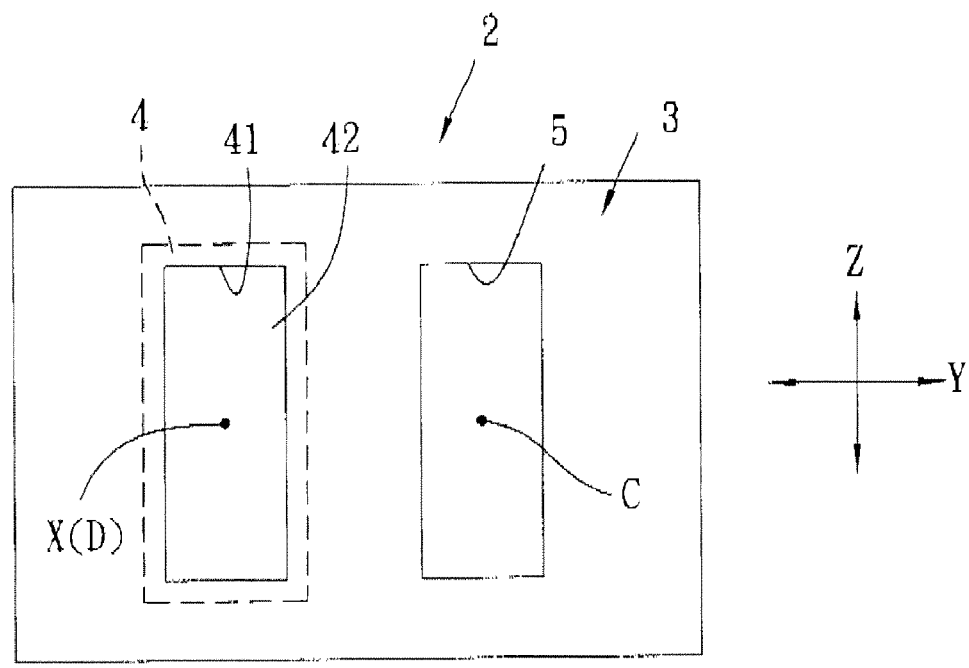
FIG. 15 is a schematic top view of the focus enhancing electromagnetic wave propagating device according to the first implementation of the first preferred embodiment in a Y-Z plane.

FIG. 15 is a schematic top view of the focus enhancing electromagnetic propagating device 2 according to the first implementation of the first preferred embodiment (whose sectional view in the X-Y plane is shown in FIG. 1a) in another dimension. The incident opening 42 of the main wave-propagating channel 41 has a shape in a plane defined by the first axis (Y) and a second axis (Z) orthogonal to the first axis (Y) and the central axis (X) that is substantially the same as that of the incident opening 51 of the auxiliary wave-propagating channel 5. In this embodiment, the shapes of the incident openings 42, 51 are shown to be rectangular. The plane defined by the first axis (Y) and a second axis (Z) is hereinafter referred to as the Y-Z plane.

Figure 16:
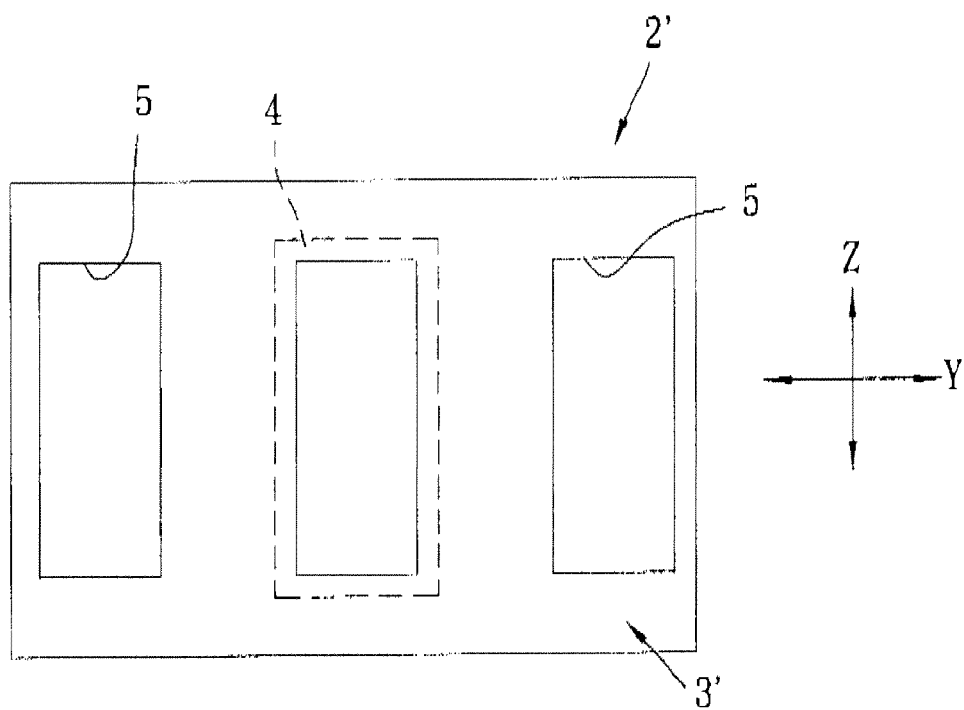
FIG. 16 is a schematic top view of the focus enhancing electromagnetic wave propagating device according to the second implementation of the first preferred embodiment in a Y-Z plane.

FIG. 16 is a schematic top view of the focus enhancing electromagnetic propagating device 2' according to the second implementation of the first preferred embodiment (whose sectional view in the X-Y plane is shown in FIG. 1b) in another dimension. The incident openings 42, 51 of the main wave-propagating channel 41 and the auxiliary wave-propagating channels 5 are shown to be rectangular in shape.

Figure 17A:
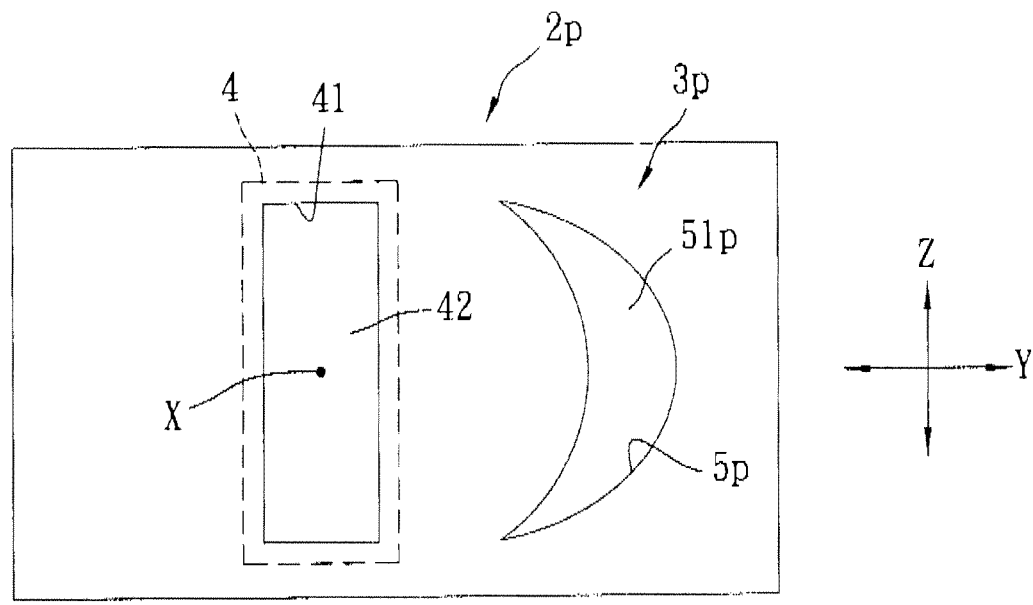
FIG. 17a is a schematic top view of the focus enhancing electromagnetic wave propagating device according to the first implementation of the fifteenth preferred embodiment of the present invention in the Y-Z plane.

With reference to FIG. 17a, according to the first implementation of the fifteenth preferred embodiment of the present invention, the shapes of the incident openings 42, 51p of the main wave-propagating channel 41 and the auxiliary wave-propagating channel 5p in the Y-Z plane are substantially different, where the incident opening 42 of the main wave-propagating channel 41 is rectangular in shape, and the incident opening 51p of the auxiliary wave-propagating channel 5p has an arcuate shape in the Y-Z plane that curves about the central axis (X) of the main wave-propagating structure 4.

Figure 17B:
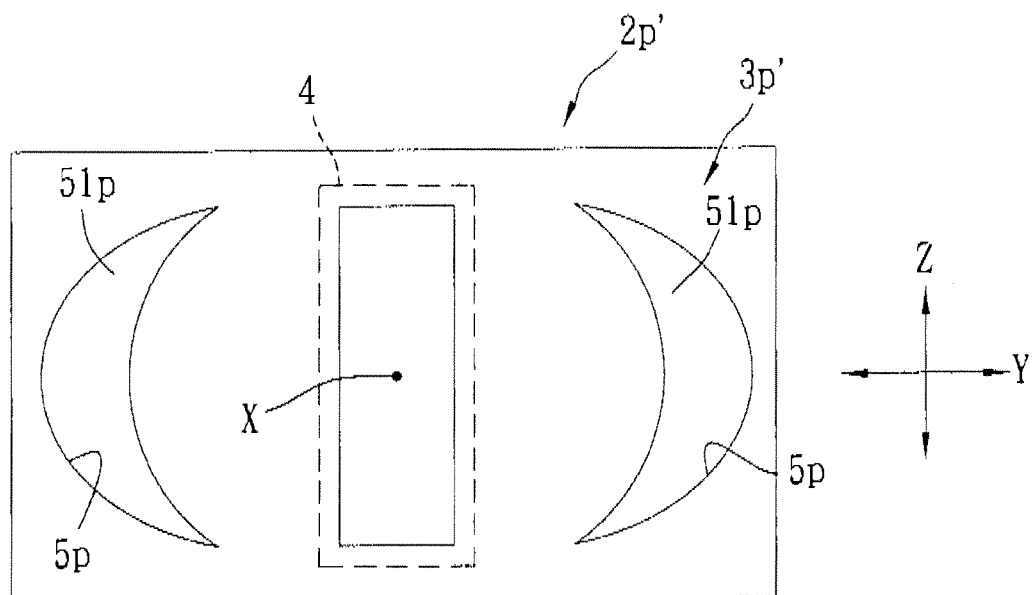
FIG. 17b is a schematic top view of the focus enhancing electromagnetic wave propagating device according to the second implementation of the fifteenth preferred embodiment of the present invention in the Y-Z plane.

With reference to FIG. 17b, the focus enhancing electromagnetic wave propagating device 2p' according to the second implementation of the fifteenth preferred embodiment of the present invention differs from the focus enhancing electromagnetic wave propagating device 2p of the first implementation of the fifteenth preferred embodiment in that the main body 3p' of the second implementation is formed with two of the auxiliary wave-propagating channels 5p, and that the main wave-propagating structure 4 is flanked by the auxiliary wave-propagating channels 5p along the first axis (Y). The auxiliary wave-propagating channels 5p are disposed symmetrically relative to the central axis (X) of the main wave-propagating structure 4.

Figure 17C:
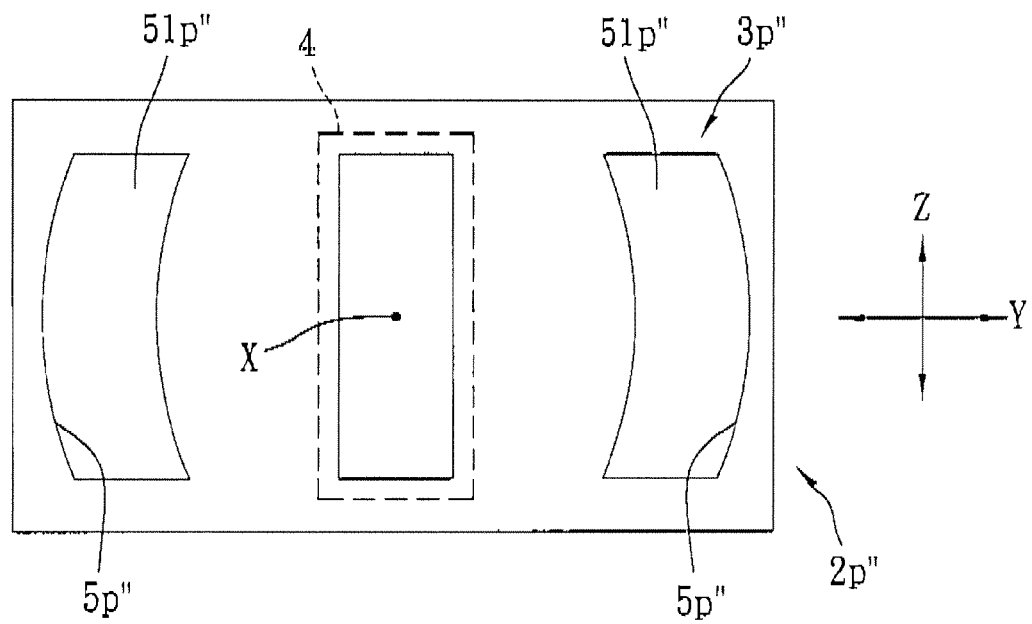
FIG. 17c is a schematic top view of the focus enhancing electromagnetic wave propagating device according to the third implementation of the fifteenth preferred embodiment of the present invention in the Y-Z plane.

With reference to FIG. 17c, the focus enhancing electromagnetic wave propagating device 2p" according to the third implementation of the fifteenth preferred embodiment of the present invention differs from the focus enhancing electromagnetic wave propagating device 2p' of the second implementation of the fifteenth preferred embodiment in that the incident openings 51p" of the auxiliary wave-propagating channels 5p" of the third implementation have a shape in the Y-Z plane of a segment of an annular ring that curves about the central axis (X) of the main wave-propagating structure 4.

Figure 17D:
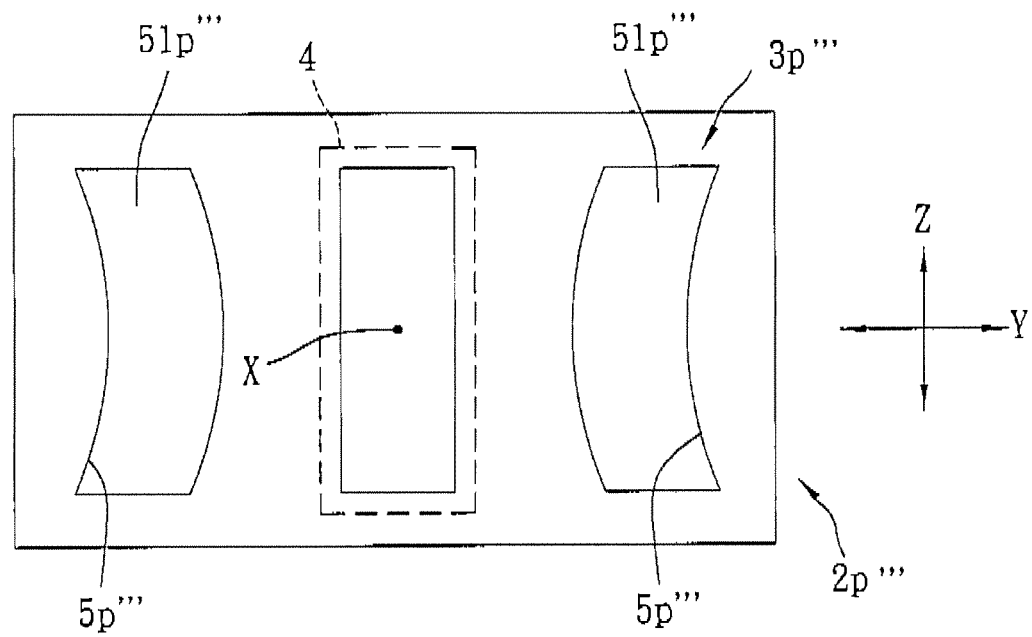
FIG. 17d is a schematic top view of the focus enhancing electromagnetic wave propagating device according to the fourth implementation of the fifteenth preferred embodiment of the present invention in the Y-Z plane.

With reference to FIG. 17d, according to the fourth implementation of the fifteenth preferred embodiment of the present invention, the focus enhancing electromagnetic wave propagating device 2p''' differs from the third implementation of the fifteenth preferred embodiment in that the incident openings 51p''' of the auxiliary wave-propagating channels 5p''' of the fourth implementation have a shape in the Y-Z plane of a segment of an annular ring that curves away from the central axis (X) of the main wave-propagating structure 4.

Figure 18:
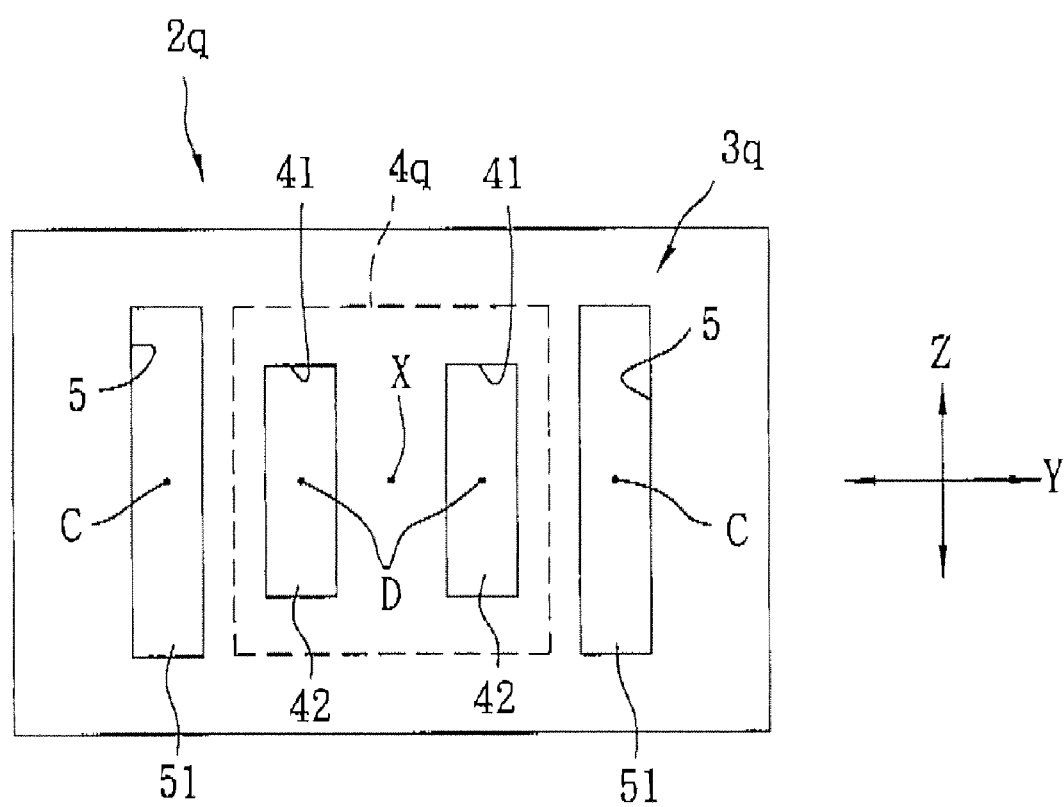
FIG. 18 is a schematic top view of the focus enhancing electromagnetic wave propagating device according to the sixteenth preferred embodiment of the present invention in the Y-Z plane.

With reference to FIG. 18, according to the sixteenth preferred embodiment of the present invention, the shapes of the incident openings 42, 51 of the main wave-propagating channels 41 and the auxiliary wave-propagating channels 5 in the Y-Z plane are substantially the same, i.e., rectangular, and are arranged symmetrically relative to the central axis (X) of the main wave-propagating structure 4q. With this symmetrical arrangement, position of the focusing light spot (P) (not shown in this figure) along the first axis (Y) is substantially unaffected by the auxiliary wave-propagating channels 5, and is therefore substantially along the central axis (X) of the main wave-propagating structure 4q. It should be noted herein that, although the incident openings 51 of the auxiliary wave-propagating channels 5 are shown to be longer in the direction of the second axis (Z) than the incident openings 42 of the main wave-propagating channels 4, the present invention is not limited to the relative dimensions of the incident openings 51, 42 in this particular aspect.

Figure 19A:
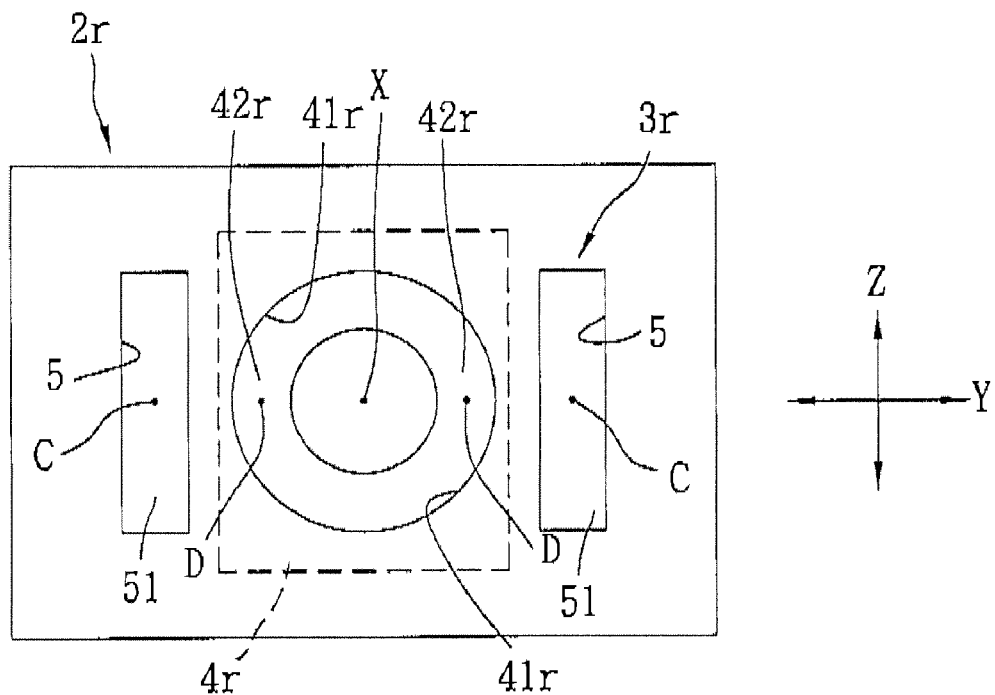
FIG. 19a is a schematic top view of the focus enhancing electromagnetic wave propagating device according to the first implementation of the seventeenth preferred embodiment of the present invention in the Y-Z plane.

With reference to FIG. 19a, according to the first implementation of the seventeenth preferred embodiment of the present invention, the shapes of the incident openings 42r, 51 of the main wave-propagating channels 41r and the auxiliary wave-propagating channels 5 in the Y-Z plane are substantially different. In particular, the incident openings 42r of the main wave-propagating channels 41r are connected to each other, i.e., they are in direct spatial communication with each other, and cooperate to form an annular shape. The incident openings 51 of the auxiliary wave-propagating channels 5 are disposed symmetrically in the direction along the first axis (Y) relative to the central axis (X) of the main wave-propagating structure 4r. Since electromagnetic waves polarized in a certain direction may only travel through channels extending along a certain direction, the advantage of having an overall annular wave-propagating channel in the main wave-propagating structure 4r is that the annular shape contributes to provide even effective areas for electromagnetic waves with different polarizations during propagation.

Figure 19B:
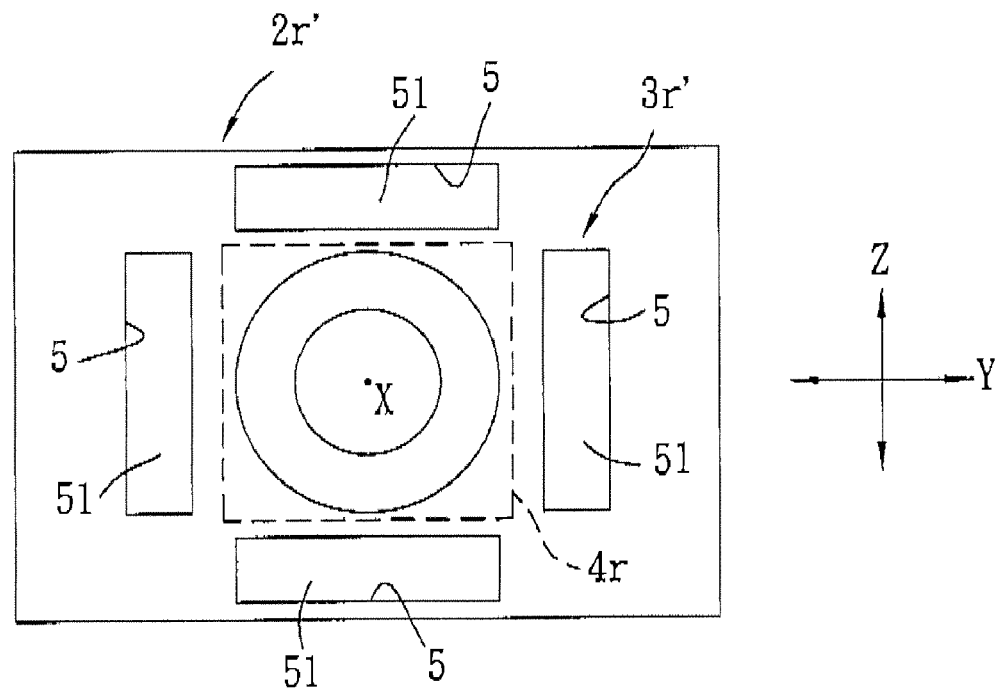
FIG. 19b is a schematic top view of the focus enhancing electromagnetic wave propagating device according to the second implementation of the seventeenth preferred embodiment of the present invention in the Y-Z plane.

With reference to FIG. 19b, the focus enhancing electromagnetic wave propagating device 2r' according to the second implementation of the seventeenth preferred embodiment of the present invention differs from the focus enhancing electromagnetic wave propagating device 2r of the first implementation of the seventeenth preferred embodiment in that the main body 3r' of the second implementation of the seventeenth preferred embodiment is provided with four of the auxiliary wave-propagating channels 5 that have rectangular incident openings 51 in the Y-Z plane. The rectangular shapes of a first pair of opposing auxiliary wave-propagating channels 5 extend in directions along the first axis (Y), and the rectangular shapes of a second pair of opposing auxiliary wave-propagating channels 5 extend in directions along the second axis (Z). The formation of the two opposite pairs of auxiliary wave-propagating channels 5 facilitates enhancement of the luminance intensity at the focusing light spot (P) (not shown in this figure) when the electromagnetic wave is polarized in two or more different directions.

Figure 20:
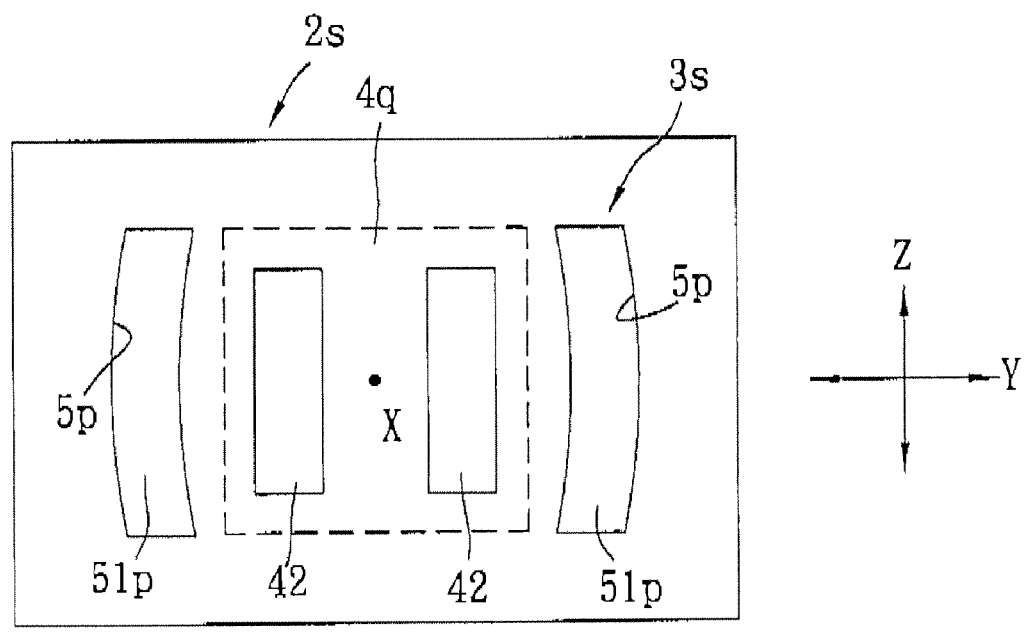
FIG. 20 is a schematic top view of the focus enhancing electromagnetic wave propagating device according to the eighteenth preferred embodiment of the present invention in the Y-Z plane.
Figure 21:
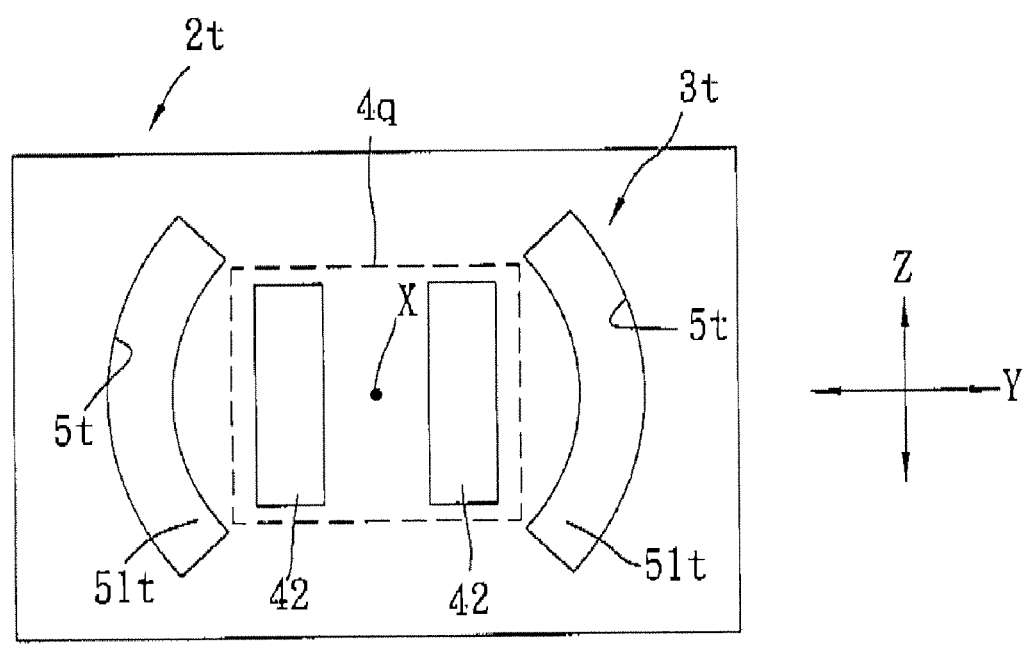
FIG. 21 is a schematic top view of the focus enhancing electromagnetic wave propagating device according to the nineteenth preferred embodiment of the present invention in the Y-Z plane.

With reference to FIG. 20, according to the eighteenth preferred embodiment of the present invention, the shapes of the incident openings 42, 51p of the main wave-propagating channels 41 and the auxiliary wave-propagating channels 5p in the Y-Z plane are substantially different, and are arranged symmetrically relative to the central axis (X) of the main wave-propagating structure 4q. In particular, the incident openings 51p of the auxiliary wave-propagating channels 5p are curved toward the central axis (X) of the main wave-propagating structure 4q. The curved shape of the incident openings 51p also takes into account the varying polarization of the electromagnetic waves to be propagated therethrough. The greater the curvature of the incident openings 51p of the auxiliary wave-propagating channels 5p toward the central axis (X) of the main wave-propagating structure 4q, the better will be the contribution of the auxiliary wave-propagating channels 5p to the enhancement of the focusing effect at the focused light spot (P) (not shown in this figure). Therefore, with reference to FIG. 21, according to the nineteenth preferred embodiment of the present invention, the shapes of the incident openings 51t of the auxiliary wave-propagating channels 5t in the Y-Z plane are essentially segments of an overall annular shape that is centered at the central axis (X) of the main wave-propagating structure 4q. Similarly, with reference to FIG. 22, according to the twentieth preferred embodiment of the present invention, the incident openings 51u of the auxiliary wave-propagating channels 5u are connected to each other in the Y-Z plane so as to form an overall annular shape.

Figure 23A:
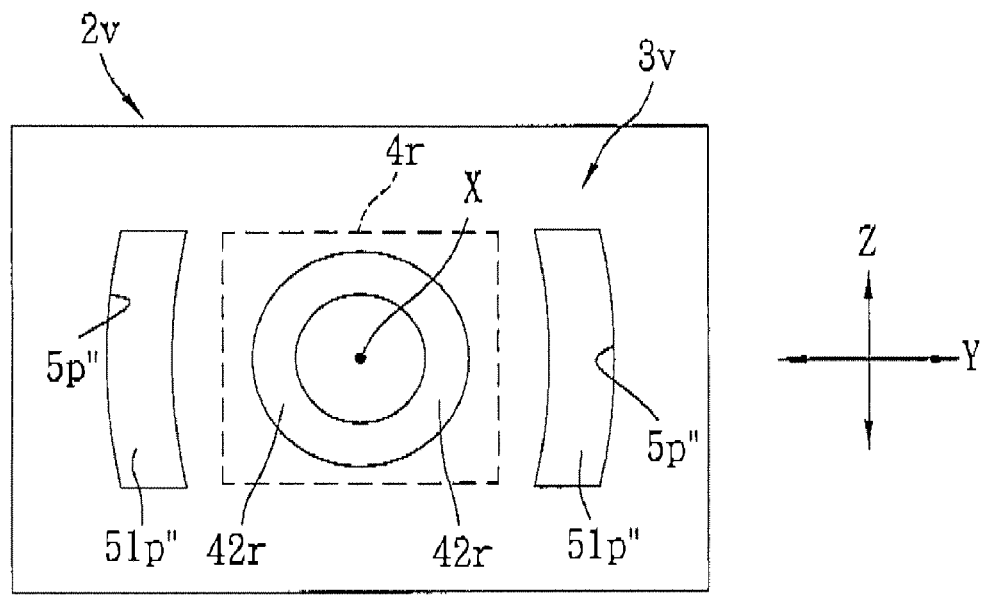
FIG. 23a is a schematic top view of the focus enhancing electromagnetic wave propagating device according to the first implementation of the twenty-first preferred embodiment of the present invention in the Y-Z plane.

With reference to FIG. 23a, according to the first implementation of the twenty-first preferred embodiment of the present invention, the focus enhancing electromagnetic propagating device 2v is basically a modification of the first implementation of the seventeenth preferred embodiment (as shown in FIG. 19a) and the eighteenth preferred embodiment (as shown in FIG. 20), where the incident openings 42r of the main wave-propagating channels 41r are connected to each other, i.e., they are in direct spatial communication with each other so as to form an annular shape, and where the incident openings 51p" of the auxiliary wave-propagating channels 5p" are curved toward the central axis (X) of the main wave-propagating structure 4r.

Figure 23B:
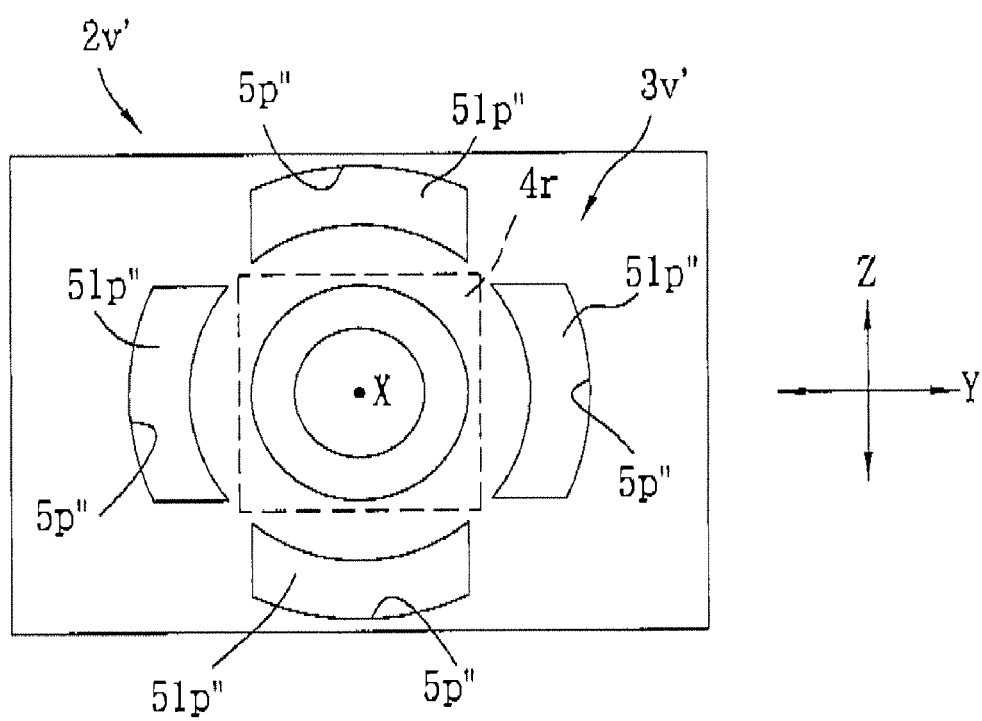
FIG. 23b is a schematic top view of the focus enhancing electromagnetic wave propagating device according to the second implementation of the twenty-first preferred embodiment of the present invention in the Y-Z plane.

With reference to FIG. 23b, the focus enhancing electromagnetic propagating device 2v' according to the second implementation of the twenty-first preferred embodiment of the present invention differs from the focus enhancing electromagnetic propagating device 2v of the first implementation of the twenty-first preferred embodiment in that the main body 3v' of the second implementation of the twenty-first preferred embodiment is provided with four of the auxiliary wave-propagating channels 5p". The formation of the two opposite pairs of the auxiliary wave-propagating channels 5p" (a total of four auxiliary wave-propagating channels 5p") facilitates enhancement of the luminance intensity at the focusing light spot (P) (not shown in this figure) when the electromagnetic wave is polarized in two different directions.

Figure 24:
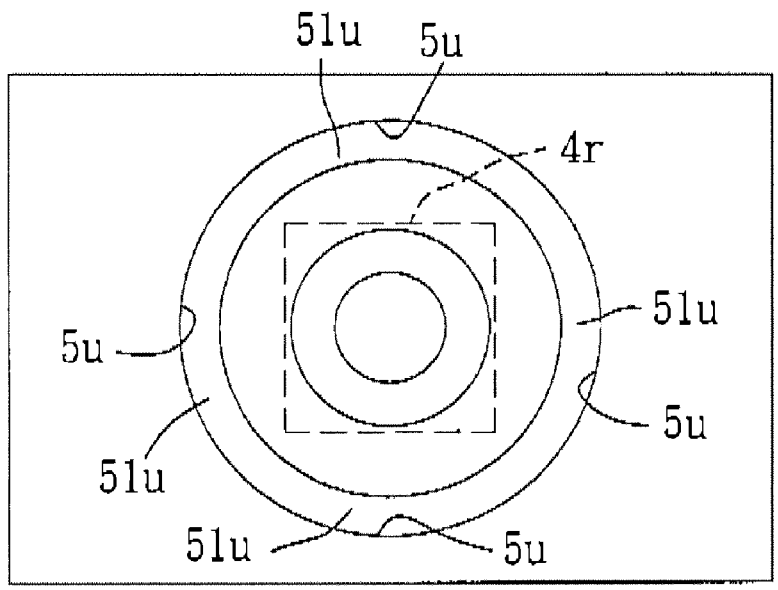
FIG. 24 is a schematic top view of the focus enhancing electromagnetic wave propagating device according to the twenty-second preferred embodiment of the present invention in the Y-Z plane.

To complement electromagnetic waves polarized in varying directions and to ensure that the auxiliary wave-propagating channels 5p" contribute to enhance the luminance intensity at the area around the focusing light spot (P) (not shown in this figure), the incident openings 51p" of the auxiliary wave-propagating channels 5p" may be connected to each other to form an overall annular shape, as illustrated in FIG. 24 according to the twenty-second preferred embodiment of the present invention. The annular shape formed by the connected incident openings 51u of the auxiliary wave-propagating channels 5u surrounds the annular shape formed by the incident openings 42r (as shown in FIG. 19a) of the main wave-propagating channels 41r (as shown in FIG. 19a). It should be noted herein that, in other embodiments of the present invention, the main body may be further formed with another set of annularly-connected auxiliary wave-propagating channels to surround the annular shape formed by the incident openings of the main wave-propagating channels and the annular shape formed by the incident openings of the original set of auxiliary wave-propagating channels.

Figure 25:
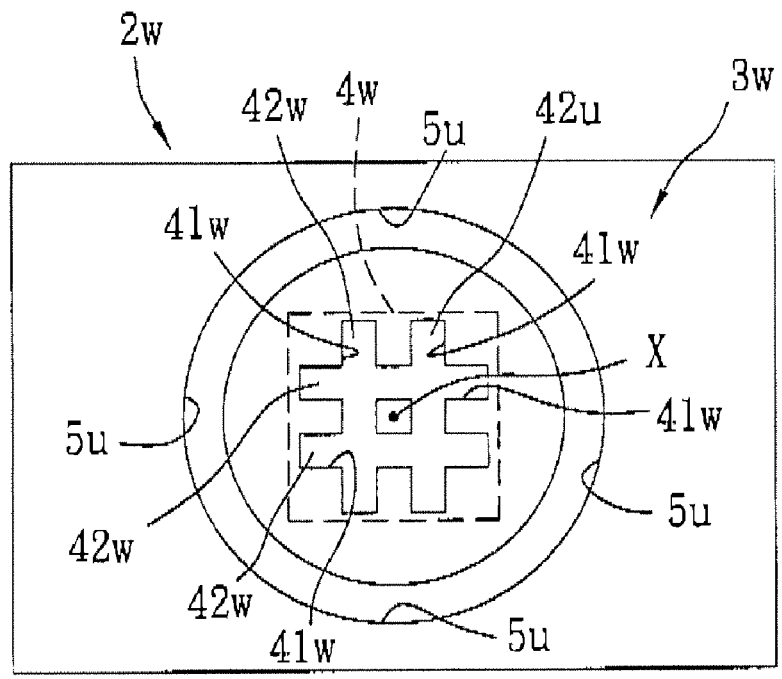
FIG. 25 is a schematic top view of the focus enhancing electromagnetic wave propagating device according to the twenty-third preferred embodiment of the present invention in the Y-Z plane.

With reference to FIG. 25, the focus enhancing electromagnetic wave propagating device 2w according to the twenty-third preferred embodiment of the present invention differs from the twenty-second preferred embodiment shown in FIG. 24 in that the main wave-propagating structure 4w is formed with a first pair of main wave-propagating channels 41w whose incident openings 42w extend in a direction along the first axis (Y), and a second pair of main wave-propagating channels 41w whose incident openings 42w extend in a direction along the second axis (Z), and intersect the incident openings 42w extending in the direction along the first axis (Y). This particular configuration creates a desirable effective area when the electromagnetic wave that emanates from the wave emanating block 1 (as shown in FIG. 1) is polarized in the directions of the first and second axes (Y), (Z). It should be noted herein that, although the two pairs of the main wave-propagating channels 41w are shown to be perpendicular to each other, the present invention is not limited to the angle between these two pairs of the main wave-propagating channels 41w.

Figure 26:
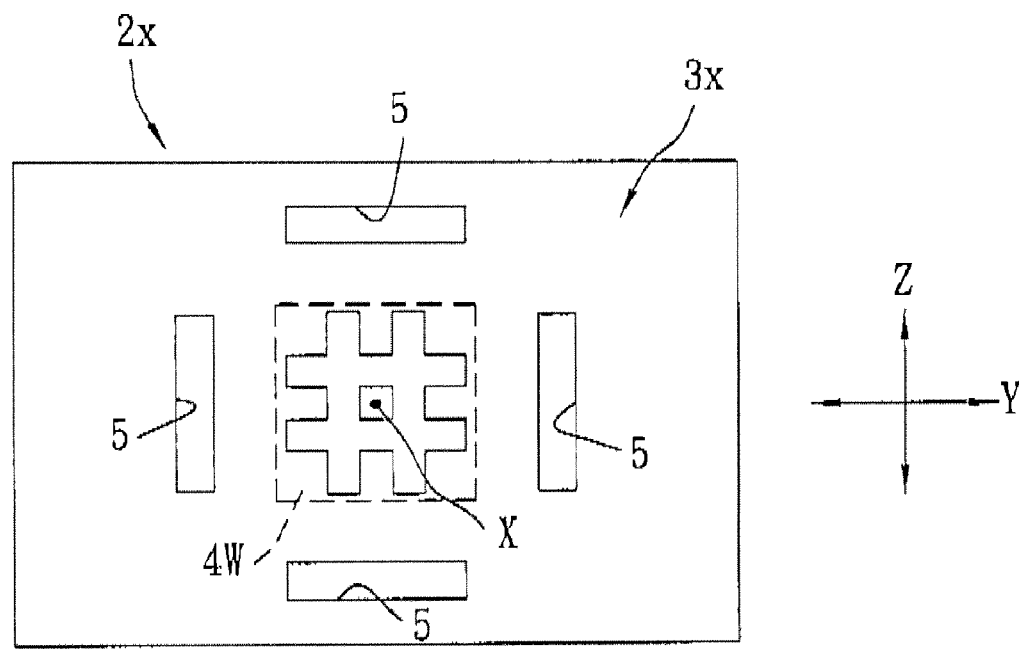
FIG. 26 is a schematic top view of the focus enhancing electromagnetic wave propagating device according to the twenty-fourth preferred embodiment of the present invention in the Y-Z plane.

With reference to FIG. 26, the focus enhancing electromagnetic wave propagating device 2x according to the twenty-fourth preferred embodiment of the present invention essentially combines the two opposite pairs of auxiliary wave-propagating channels 5 according to the second implementation of the seventeenth preferred embodiment (as shown in FIG. 19b) and the main wave-propagating structure 4w according to the twenty-third preferred embodiment (as shown in FIG. 25).

Figure 27:
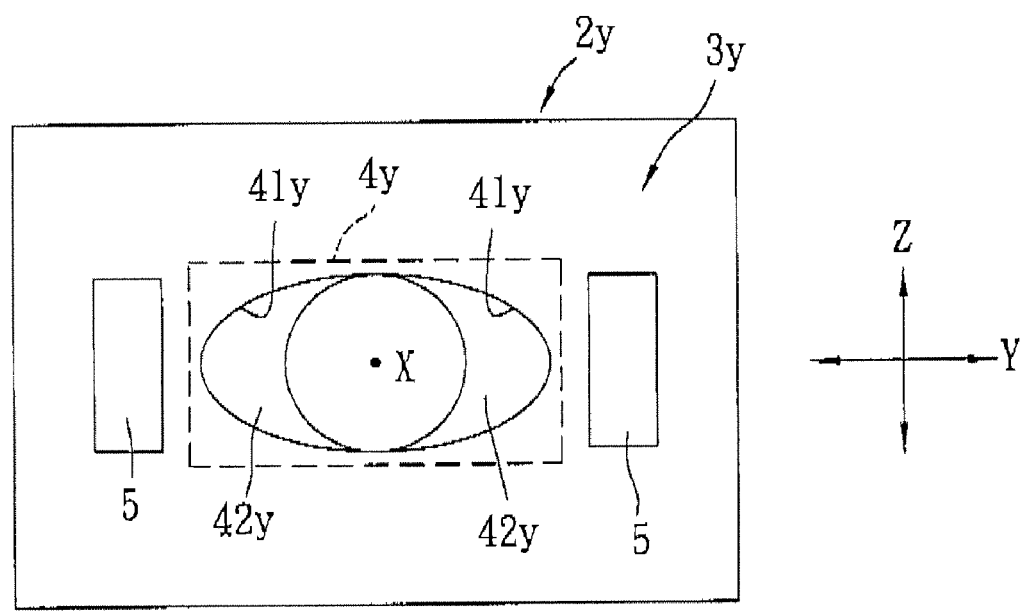
FIG. 27 is a schematic top view of the focus enhancing electromagnetic wave propagating device according to the twenty-fifth preferred embodiment of the present invention in the Y-Z plane.

With reference to FIG. 27, the focus enhancing electromagnetic wave propagating device 2y according to the twenty-fifth preferred embodiment of the present invention differs from the focus enhancing electromagnetic wave propagating device 2q of the sixteenth preferred embodiment in that the main wave-propagating structure 4y of the focus enhancing electromagnetic wave propagating device 2y is formed with two main wave-propagating channels 41y, the incident opening 42y of each of which has an arcuate shape that curves toward the central axis (X) of the main wave-propagating structure 4y in the Y-Z plane. In particular, the arcuate shapes are connected at two tips thereof such that the incident openings 42y of the main wave-propagating channels 41y cooperate to form the main body 3y with an eye-shaped configuration in the Y-Z plane.

Figure 28:
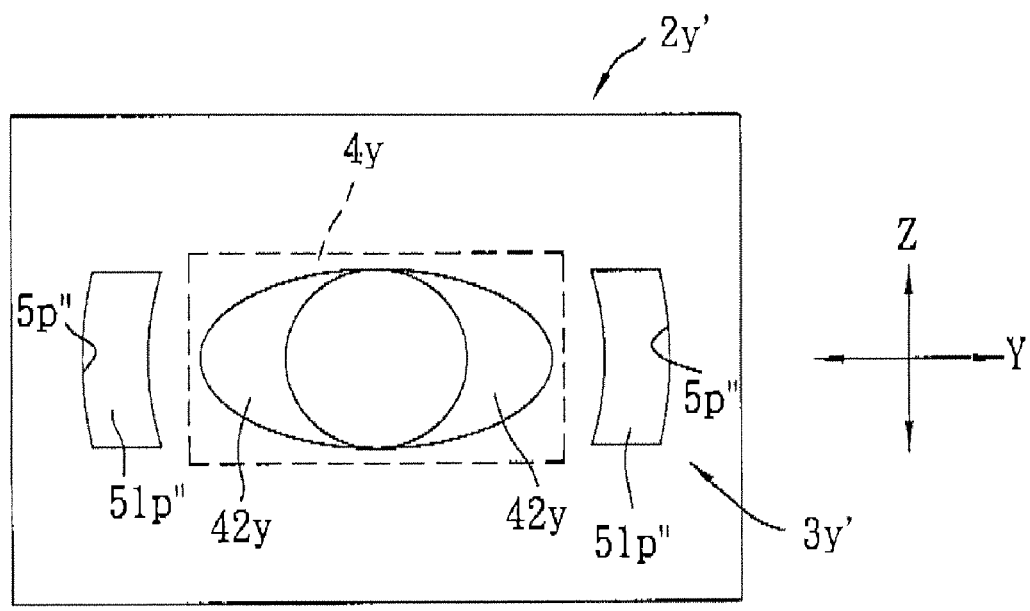
FIG. 28 is a schematic top view of the focus enhancing electromagnetic wave propagating device according to the twenty-sixth preferred embodiment of the present invention in the Y-Z plane.

With reference to FIG. 28, the focus enhancing electromagnetic wave propagating device 2y' according to the twenty-sixth preferred embodiment of the present invention essentially combines the two auxiliary wave-propagating channels 5p" according to the eighteenth preferred embodiment (as shown in FIG. 20) and the main wave-propagating structure 4y according to the twenty-fifth preferred embodiment (as shown in FIG. 27).

Figure 22:
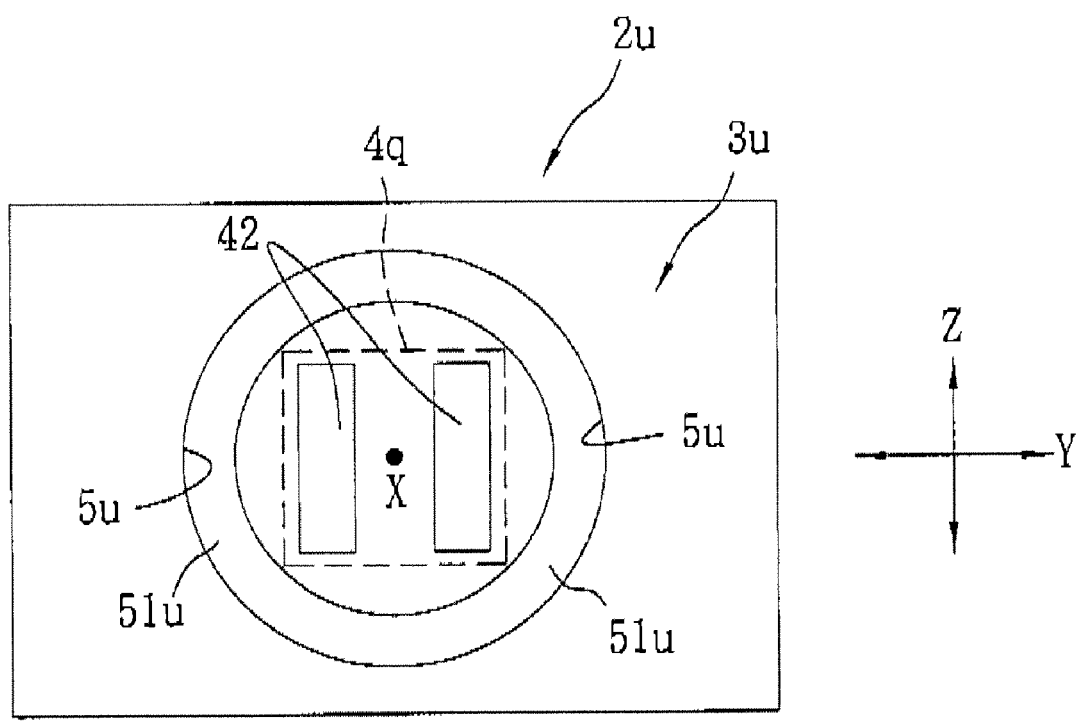
FIG. 22 is a schematic top view of the focus enhancing electromagnetic wave propagating device according to the twentieth preferred embodiment of the present invention in the Y-Z plane.
Figure 29:
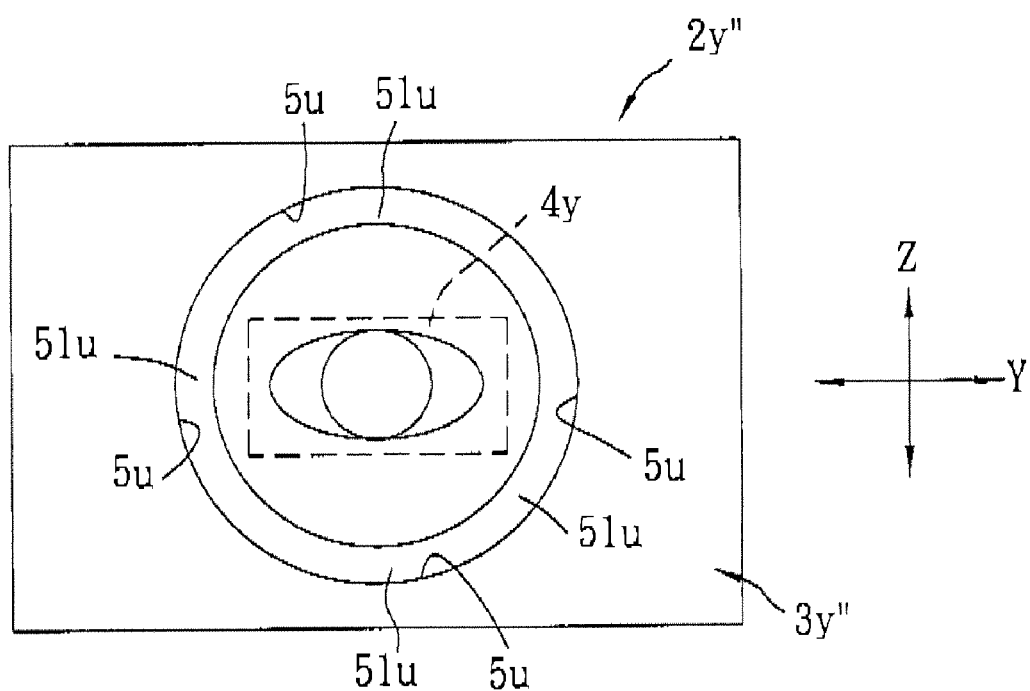
FIG. 29 is a schematic top view of the focus enhancing electromagnetic wave propagating device according to the twenty-seventh preferred embodiment of the present invention in the Y-Z plane.

With reference to FIG. 29, the focus enhancing electromagnetic wave propagating device 2y" according to the twenty-seventh preferred embodiment of the present invention essentially combines the main wave-propagating structure 4y according to the twenty-fifth preferred embodiment (as shown in FIG. 27) and the auxiliary wave-propagating channels 5u whose incident openings 51u cooperate to form an overall annular shape according to the twentieth preferred embodiment (as shown in FIG. 22).

Figure 30:
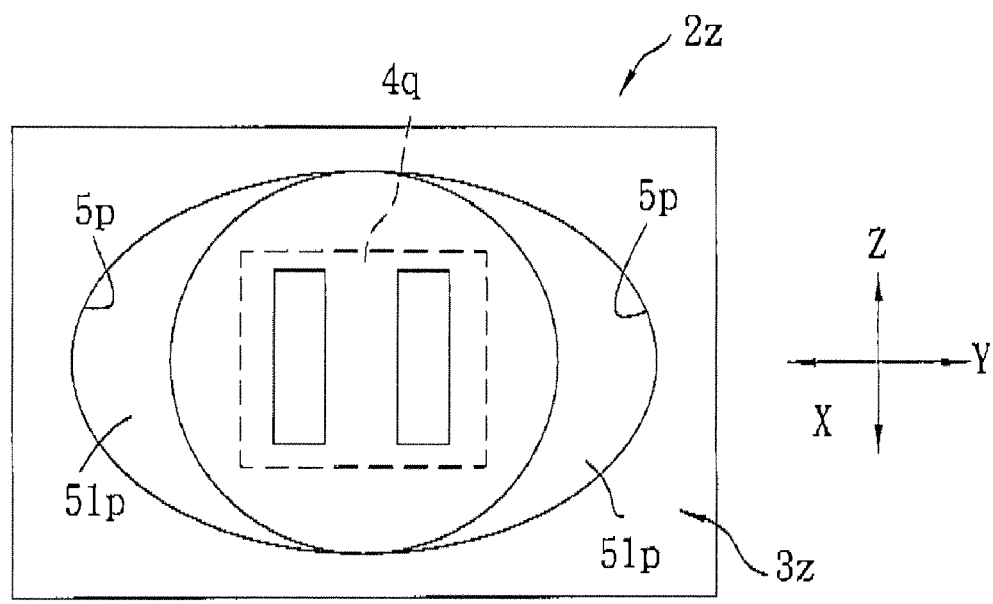
FIG. 30 is a schematic top view of the focus enhancing electromagnetic wave propagating device according to the twenty-eighth preferred embodiment of the present invention in the Y-Z plane.

With reference to FIG. 30, the focus enhancing electromagnetic wave propagating device 2z according to the twenty-eighth preferred embodiment of the present invention essentially combines the main wave-propagating structure 4q according to the sixteenth preferred embodiment (as shown in FIG. 18) and the auxiliary wave-propagating channels 5p according to the second implementation of the fifteenth preferred embodiment (as shown in FIG. 17b). However, the arcuate shapes of the incident openings 51p of the auxiliary wave-propagating channels 5p are connected to each other in this embodiment such that the incident openings 51p cooperate to form the main body 3z with an eye-shaped configuration in the Y-Z plane.

Figure 31:
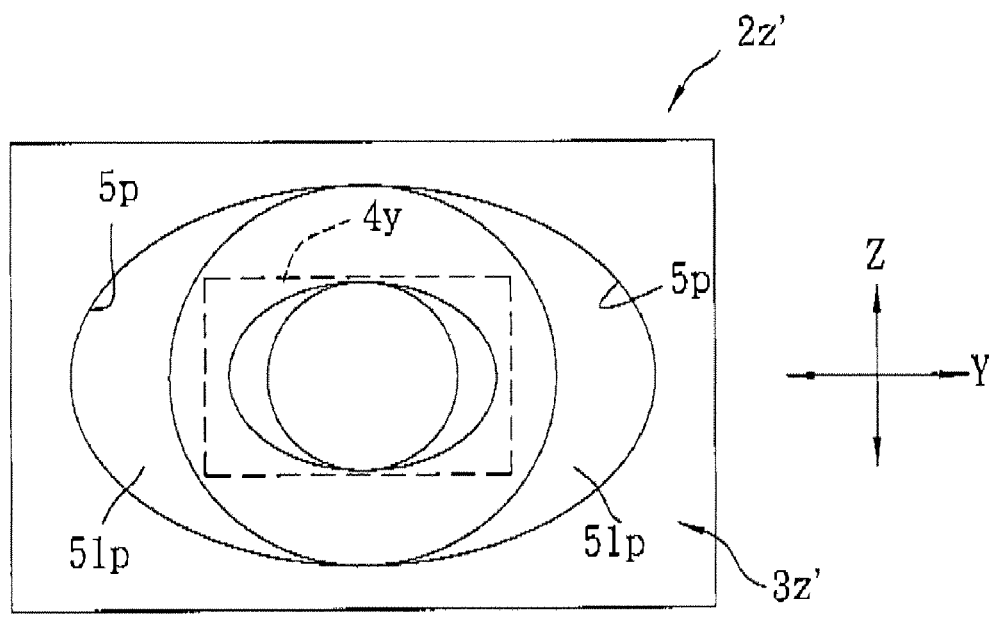
FIG. 31 is a schematic top view of the focus enhancing electromagnetic wave propagating device according to the twenty-ninth preferred embodiment of the present invention in the Y-Z plane.

With reference to FIG. 31, the focus enhancing electromagnetic wave propagating device 2z' according to the twenty-ninth preferred embodiment of the present invention essentially combines the main wave-propagating structure 4y according to the twenty-fifth preferred embodiment (as shown in FIG. 27) and the configuration of the auxiliary wave-propagating channels 5p according to the twenty-eighth preferred embodiment (as shown in FIG. 30).

Figure 32:
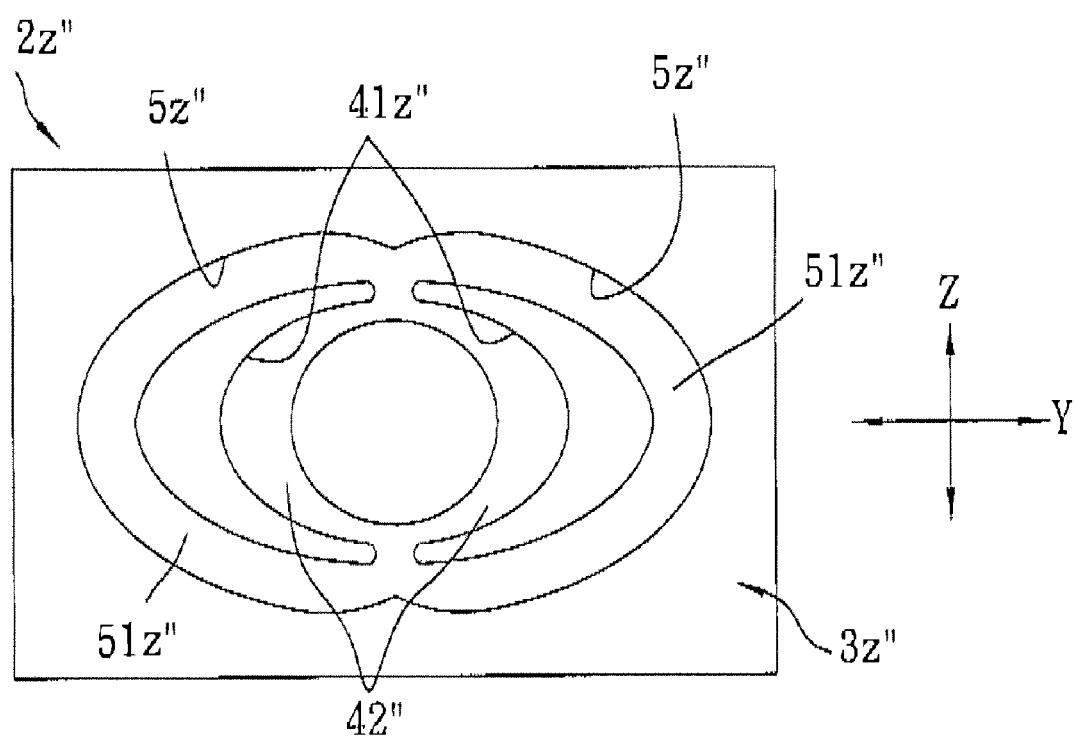
FIG. 32 is a schematic top view of the focus enhancing electromagnetic wave propagating device according to the thirtieth preferred embodiment of the present invention in the Y-Z plane.

With reference to FIG. 32, the focus enhancing electromagnetic wave propagating device 2z" according to the thirtieth preferred embodiment of the present invention differs from the twenty-ninth preferred embodiment in that the incident openings 42z", 51z" of the main wave-propagating channels 41z" and the auxiliary wave-propagating channels 5z" are in direct spatial communication with each other in the Y-Z plane.

It should be further, noted herein that although FIGS. 15~16, 17a~17d, 18, 19a~19b, 20~22, 23a~23b, and 24~32 are schematic top views of the focus enhancing electromagnetic wave propagating devices according to various embodiments of the present invention, the shapes shown therein are also representative of the cross-sectional profiles of the focus enhancing electromagnetic wave propagating devices in the Y-Z plane according to various embodiments of the present invention.

It should be further noted herein that the auxiliary wave-propagating channels 5 may be formed repeatedly about the central axis (X) of the main wave-propagating structure 4 in other embodiments of the present invention. For example, the cross-sectional of the profile auxiliary wave-propagating channels 5 in the Y-Z plane may be two concentric circles of different radii with centers at the central axis (X) of the main wave-propagating structure 4 and encircling the main wave-propagating structure 4, which can itself have varying profiles in the Y-Z plane.

In summary, the present invention achieves the effect of enhancing the luminance intensity of a focusing light spot that is formed by an electromagnetic wave traveling through a main wave-propagating structure by providing auxiliary wave-propagating channel(s) to allow for the electromagnetic wave to propagate therethrough and to guide the electromagnetic wave traveling therethrough toward the focusing light spot and to create constructive interference between the electromagnetic wave traveling through the main wave-propagating structure and the electromagnetic wave traveling through the auxiliary wave-propagating channel(s). In addition, a full-width-half-maximum (FWHM) spot size of the focusing light spot is also reduced. Moreover, the present invention also achieves the effect of adjusting the position of the focusing light spot by providing the auxiliary wave-propagating channel(s) in the main body asymmetrically relative to a central axis of the main wave-propagating structure.

It should be noted herein that, although the main wave-propagating channels are shown to be larger in dimension than the auxiliary wave-propagating channels in the accompanying drawings, the present invention is not limited to such configurations.

It should be further noted herein that the shapes, configurations and arrangements of the main wave-propagating channels and the auxiliary wave-propagating channels may be interchanged among all of the different embodiments previously illustrated.

Furthermore, the focus enhancing electromagnetic wave propagating device may work under all kinds of environments and media, including vacuum, air, water, oil, glass, silicon, dielectric, etc.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A focus enhancing electromagnetic wave propagating device adapted for use with a wave emanating block, from which an electromagnetic wave having a wavelength is adapted to propagate in a wave-propagating direction, said focus enhancing electromagnetic wave propagating device comprising:
   a main body that has surfaces capable of blacking propagation of the electromagnetic wave, and that includes an incident side and an exit side opposite to said incident side in the wave-propagating direction, said main body being formed with a main wave-propagating structure that extends from said incident side to said exit side, that defines a central axis, and that is adapted to allow the electromagnetic wave to propagate from the wave emanating block therethrough for focusing into a focusing light spot;
   wherein said main body is further formed with an auxiliary wave-propagating channel that extends from said incident side to said exit side, that has an inner dimension not greater than the wavelength of the electromagnetic wave, and that defines a channel axis, which is parallel to the central axis, said main wave-propagating structure having an exit end at said exit side of said main body, said auxiliary wave-propagating channel having an exit opening at said exit side of said main body, said auxiliary wave-propagating channel being adapted to allow the electromagnetic wave to propagate from the wave emanating block therethrough toward the focusing light spot;
   wherein a phase difference is present between the electromagnetic wave after traveling through said main wave-propagating structure at said exit end of said main wave-propagating structure and the electromagnetic wave after traveling through said auxiliary wave-propagating channel at said exit opening of said auxiliary wave-propagating channel, such that constructive interference is generated at the focusing light spot between the electromagnetic wave traveling through said main wave-propagating structure and the electromagnetic wave traveling through said auxiliary wave-propagating channel, the required phase difference being a function of a distance between the focusing light spot and said exit end of said main wave-propagating structure, a distance between the focusing light spot and said exit opening of said auxiliary wave-propagating channel, velocities of the electromagnetic wave after traveling through each of said main wave-propagating structure and said auxiliary wave-propagating channel, and angular frequencies of the electromagnetic wave after traveling through each of said main wave-propagating structure and said auxiliary wave-propagating channel.

2. The focus enhancing electromagnetic wave propagating device as claimed in claim 1, wherein the distance between said exit opening of said auxiliary wave-propagating channel and the focusing light spat ranges between the following values:

$$r_A^+ = \frac{v_A}{\omega_A}\left(\Delta\phi + \frac{\pi}{2} + \frac{\omega_M}{v_M}r_M\right)$$

$$r_A^- = \frac{v_A}{\omega_A}\left(\Delta\phi - \frac{\pi}{2} + \frac{\omega_M}{v_M}r_M\right)$$

where $r_A^+$ is one of a maximum value and a minimum value of the distance between said exit opening of said auxiliary wave-propagating channel and the focusing light spot, $r_A^-$ is the other one of a maximum value and a minimum value of the distance between said exit opening of said auxiliary wave-propagating channel and the focusing light spot, $v_A$ is the velocity of the electromagnetic wave after traveling through said auxiliary wave-propagating channel, $\omega_A$ is the angular frequency of the electromagnetic wave after traveling through said auxiliary wave-propagating channel, $\Delta\phi$ is the phase difference between the electromagnetic wave after traveling through said main wave-propagating structure at said exit end of said main wave-propagating structure and the electromagnetic wave after traveling through said auxiliary wave-propagating channel at said exit opening of said auxiliary wave-propagating channel, $\omega_M$ is the angular frequency of the electromagnetic wave after traveling through said main wave-propagating structure, $v_M$ is the velocity of the electromagnetic wave after traveling through said main wave-propagating structure, and $r_M$ is the distance between said exit end of said main wave-propagating structure and the focusing light spot.

3. The focus enhancing electromagnetic wave propagating device as claimed in claim 1, wherein the channel axis of said auxiliary wave-propagating channel is spaced apart from the central axis of said main wave-propagating structure along a first axis, said auxiliary wave-propagating channel having an incident opening at said incident side of said main body, and an inner portion that extends between said incident and exit openings, and that defines the channel axis, said exit opening of said auxiliary wave-propagating channel being asymmetrical about the channel axis in a plane defined by the central axis and the first axis.

4. The focus enhancing electromagnetic wave propagating device as claimed in claim 3, wherein said exit opening of said auxiliary wave-propagating channel has first and second halves about the channel axis in the plane defined by the central axis and the first axis, said first and second halves being respectively proximate to and distal from the central axis of said main wave-propagating structure, said first half having a dimension greater than that of said second half.

5. The focus enhancing electromagnetic wave propagating device as claimed in claim 1, wherein said main wave-propagating structure is formed with two main wave-propagating channels, each of which extends from said incident side to said exit side of said main body, has an exit opening at said exit end of said main wave-propagating structure, and defines a central line parallel to the central axis, said auxiliary wave-propagating channel being flanked by said main wave-propagating channels, the channel axis of said auxiliary wave-propagating channel being spaced apart from the central line of each of said main wave-propagating channels along a first axis, said focus enhancing electromagnetic wave propagating device further comprising a first light-transmissible dielectric that is filled in each of said main wave-propagating channels, and a second light-transmissible dielectric that is different from the first light-transmissible dielectric, and that is filled in said auxiliary wave-propagating channel.

6. The focus enhancing electromagnetic wave propagating device as claimed in claim 5, wherein said exit openings of said main wave-propagating channels are in direct spatial communication with each other along the first axis.

7. The focus enhancing electromagnetic wave propagating device as claimed in claim 1, wherein said main body is formed with two of said auxiliary wave-propagating channels that flank said main wave-propagating structure, the channel axis of each of said auxiliary wave-propagating channels being spaced apart from the central axis of said main wave-propagating structure along a first axis.

8. The focus enhancing electromagnetic wave propagating device as claimed in claim 7, wherein each of said auxiliary wave-propagating channels has an incident opening at said incident side of said main body, and an inner portion that extends between said incident and exit openings, and that defines the channel axis, said exit opening of each of said auxiliary wave-propagating channels being asymmetrical about the channel axis in a plane defined by the central axis and the first axis.

9. The focus enhancing electromagnetic wave propagating device as claimed in claim 6, wherein said exit opening of each of said auxiliary wave-propagating channels has first and second halves about the channel axis in the plane defined by the central axis and the first axis, said first and second halves being respectively proximate to and distal from the central axis of said main wave-propagating structure, said first half having a dimension greater than that of said second half.

10. The focus enhancing electromagnetic wave propagating device as claimed in claim 7, wherein said auxiliary wave-propagating channels are symmetrically disposed relative to the central axis of said main wave-propagating structure along the first axis.

11. The focus enhancing electromagnetic wave propagating device as claimed in claim 1, wherein said main wave-propagating structure is formed with two main wave-propagating channels, each of which extends from said incident side to said exit side, has an exit opening at said exit end of said main wave-propagating structure, and defines a central line parallel to the central axis, the channel axis of said auxiliary wave-propagating channel being spaced apart from the central line of each of said main wave-propagating channels along a first axis, said exit openings of said main wave-propagating channels being in direct spatial communication with each other along the first axis, said auxiliary wave-propagating channel being disposed proximate to one of said main wave-propagating channels.

12. The focus enhancing electromagnetic wave propagating device as claimed in claim 11, wherein said main body is formed with two of said auxiliary wave-propagating channels that flank said main wave-propagating structure, such that the channel axis of each of said auxiliary wave-propagating channels is disposed proximate to the central line of a respective one of said main wave-propagating channels, and is spaced apart from the central line of the respective one of said main wave-propagating channels along the first axis.

13. The focus enhancing electromagnetic wave propagating device as claimed in claim 12, wherein each of said auxiliary wave-propagating channels has an incident opening at said incident side of said main body, and an inner portion that extends between said incident and exit openings, and that defines the channel axis, said exit opening of each of said auxiliary wave-propagating channels being asymmetrical about the channel axis in the plane defined by the central axis and the first axis.

14. The focus enhancing electromagnetic wave propagating device as claimed in claim 1, wherein said main wave-propagating structure is formed with a main wave-propagating channel that extends from said incident side to said exit side, the channel axis of said auxiliary wave-propagating channel being spaced apart from the central axis of said main wave-propagating structure along a first axis, said main wave-propagating channel having a shape in a plane defined by the first axis and a second axis orthogonal to the first axis and the central axis that is substantially the same as that of said auxiliary wave-propagating channel.

15. The focus enhancing electromagnetic wave propagating device as claimed in claim 1, wherein said main wave-propagating structure is formed with a main wave-propagating channel that extends from said incident side to said exit side, the channel axis of said auxiliary wave-propagating channel being spaced apart from the central axis of said main wave-propagating structure along a first axis, said main wave-propagating channel having a shape in a plane defined by the first axis and a second axis orthogonal to the first axis and the central axis that is different from that of said auxiliary wave-propagating channel.

16. The focus enhancing electromagnetic wave propagating device as claimed in claim 1, wherein said main wave-propagating structure is formed with a main wave-propagating channel that extends from said incident side to said exit side, said main wave-propagating channel and said auxiliary wave-propagating channel being in direct spatial communication with each other.

17. The focus enhancing electromagnetic wave propagating device as claimed in claim 1, further comprising a light-transmissible dielectric that is filled in said auxiliary wave-propagating channel.

18. A method for focusing an electromagnetic wave that propagates from a wave emanating block in a wave-propagating direction into a focusing light spot, the method comprising the step of:
providing a focus enhancing electromagnetic wave propagating device including a main body that has surfaces capable of blocking propagation of the electromagnetic wave, and that includes an incident side and an exit side opposite to the incident side in the wave-propagating direction, the main body being formed with a main wave-propagating structure that extends from the incident side to the exit side, that defines a central axis, and that is adapted to allow the electromagnetic wave to propagate from the wave emanating block therethrough for focusing into a focusing light spot;
wherein the main body is further formed with an auxiliary wave-propagating channel that extends from the incident side to the exit side, that has an inner dimension not greater than the wavelength of the electromagnetic wave, and that defines a channel axis, which is parallel to the central axis, the main wave-propagating structure having an exit end at the exit side of the main body, the auxiliary wave-propagating channel having an exit opening at the exit side of the main body, the auxiliary wave-propagating channel being adapted to allow the electromagnetic wave to propagate from the wave emanating block therethrough toward the focusing light spot;
wherein a phase difference is present between the electromagnetic wave after traveling through the main wave-propagating structure at the exit end of the main wave-propagating structure and the electromagnetic wave after traveling through the auxiliary wave-propagating channel at the exit opening of the auxiliary wave-propagating channel, such that constructive interference is generated at the focusing light spot between the electromagnetic wave traveling through the main wave-propagating structure and the electromagnetic wave traveling through the auxiliary wave-propagating channel, the required phase difference being a function of a distance between the focusing light spot and the exit end of the main wave-propagating structure, a distance between the focusing light spot and the exit opening of the auxiliary wave-propagating channel, velocities of the electromagnetic wave after traveling through each of the main wave-propagating structure and the auxiliary wave-propagating channel, and angular frequencies of the electromagnetic wave after traveling through each of the main wave-propagating structure and the auxiliary wave-propagating channel.

19. The method as claimed in claim 18, wherein the distance between the exit opening of the auxiliary wave-propagating channel and the focusing light spot ranges between the following values:

$$r_A^+ = \frac{v_A}{\omega_A}\left(\Delta\phi + \frac{\pi}{2} + \frac{\omega_M}{v_M}r_M\right)$$

$$r_A^- = \frac{v_A}{\omega_A}\left(\Delta\phi - \frac{\pi}{2} + \frac{\omega_M}{v_M}r_M\right)$$

where $r_A^+$ is one of a maximum value and a minimum value of the distance between the exit opening of the auxiliary wave-propagating channel and the focusing light spot, $r_A^-$ is the other one of a maximum value and a minimum value of the distance between the exit opening of the auxiliary wave-propagating channel and the focusing light spot, $v_A$ is the velocity of the electromagnetic wave after traveling through the auxiliary wave-propagating channel, $\omega_A$ is the angular frequency of the electromagnetic wave after traveling through the auxiliary wave-propagating channel, $\Delta\phi$ is the phase difference between the electromagnetic wave after traveling through the main wave-propagating structure at the exit end of the main wave-propagating structure and the electromagnetic wave after traveling through the auxiliary wave-propagating channel at the exit opening of the auxiliary wave-propagating channel, $\omega_M$ is the angular frequency of the electromagnetic wave after traveling through the main wave-propagating structure, $v_M$ is the velocity of the electromagnetic wave after traveling through the main wave-propagating structure, and $r_M$ is the distance between the exit end of the main wave-propagating structure and the focusing light spot.

20. The method as claimed in claim 18, wherein the auxiliary wave-propagating channel has an incident opening at the incident side of the main body, and an inner portion that extends between the incident and exit openings, and that defines the channel axis, the channel axis of the auxiliary wave-propagating channel being spaced apart from the central axis of the main wave-propagating structure along a first axis, the exit opening of the auxiliary wave-propagating channel being asymmetrical about the channel axis in a plane defined by the central axis and the first axis.

21. The method as claimed in claim 20, wherein the exit opening of the auxiliary wave-propagating channel has first and second halves about the channel axis in the plane defined by the central axis and the first axis, the first and second having being respectively proximate to and distal from the central axis of the main wave-propagating structure, the first half having a dimension greater than that of the second half.

22. A light spot generator comprising:
a wave emanating block, from which an electromagnetic wave having a wavelength is adapted to propagate in a wave-propagating direction; and
a focus enhancing electromagnetic wave propagating device including a main body that has surfaces capable of blocking propagation of the electromagnetic wave, and that includes an incident side and an exit side opposite to said incident side in the wave-propagating direction, said main body being formed with a main wave-propagating structure that extends from said incident side to said exit side, that defines a central axis, and that is adapted to allow the electromagnetic wave to propagate from the wave emanating block therethrough for focusing into a focusing light spot;

wherein said main body is further formed with an auxiliary wave-propagating channel that extends from said incident side to said exit side, that has an inner dimension not greater than the wavelength of the electromagnetic wave, and that defines a channel axis, which is parallel to the central axis, said main wave-propagating structure having an exit end at said exit side of said main body, said auxiliary wave-propagating channel having an exit opening at said exit side of said main body, said auxiliary wave-propagating channel being adapted to allow the electromagnetic wave to propagate from the wave emanating block therethrough toward the focusing light spot;

wherein a phase difference is present between the electromagnetic wave after traveling through said main wave-propagating structure at said exit end of said main wave-propagating structure and the electromagnetic wave after traveling through said auxiliary wave-propagating channel at said exit opening of said auxiliary wave-propagating channel, such that constructive interference is generated at the focusing light spot between the electromagnetic wave traveling through said main wave-propagating structure and the electromagnetic wave traveling through said auxiliary wave-propagating channel, the required phase difference being a function of a distance between the focusing light spot and said exit end of said main wave-propagating structure, a distance between the focusing light spot and said exit opening of said auxiliary wave-propagating channel, velocities of the electromagnetic wave after traveling through each of said main wave-propagating structure and said auxiliary wave-propagating channel, and angular frequencies of the electromagnetic wave that travels through each of said main wave-propagating structure and said auxiliary wave-propagating channel.

\* \* \* \* \*